United States Patent
Kockerbeck et al.

(10) Patent No.: US 11,227,592 B1
(45) Date of Patent: Jan. 18, 2022

(54) CONTEXTUAL CONTENT FOR VOICE USER INTERFACES

(71) Applicant: Amazon Technologies, Inc., Seattle, WA (US)

(72) Inventors: Mark Conrad Kockerbeck, Irvine, CA (US); Muhammad Yahia, Anaheim, CA (US); Jordan Michael Hughes, San Diego, CA (US); Kevin Boehm, Seattle, WA (US); Rohit Sauhta, San Diego, CA (US)

(73) Assignee: Amazon Technologies, Inc., Seattle, WA (US)

( * ) Notice: Subject to any disclaimer, the term of this patent is extended or adjusted under 35 U.S.C. 154(b) by 90 days.

(21) Appl. No.: 16/455,530

(22) Filed: Jun. 27, 2019

(51) Int. Cl.
*G10L 15/22* (2006.01)
*G10L 15/30* (2013.01)
*G10L 15/18* (2013.01)

(52) U.S. Cl.
CPC .......... *G10L 15/22* (2013.01); *G10L 15/1815* (2013.01); *G10L 15/30* (2013.01); *G10L 2015/223* (2013.01)

(58) Field of Classification Search
USPC .................. 704/246, 247, 251, 252, 257
See application file for complete search history.

(56) References Cited

U.S. PATENT DOCUMENTS

| | | | |
|---|---|---|---|
| 2018/0143967 A1* | 5/2018 | Anbazhagan | G06F 40/35 |
| 2018/0336897 A1* | 11/2018 | Aggarwal | G10L 25/51 |
| 2018/0366114 A1* | 12/2018 | Anbazhagan | G06F 9/4451 |
| 2019/0042564 A1* | 2/2019 | Badr | G06F 9/468 |
| 2019/0074010 A1* | 3/2019 | Horling | G10L 15/1815 |
| 2019/0103101 A1* | 4/2019 | Danila | G10L 15/1815 |

\* cited by examiner

*Primary Examiner* — Leonard Saint Cyr
(74) *Attorney, Agent, or Firm* — Pierce Atwood LLP

(57) ABSTRACT

The present disclosure describes techniques for dynamically determining when information is to be output to a user, as well as what information is to be output to a user. A natural language processing system may receive, from a first device, first data representing information to be output at a first point during a skill session. The natural language processing system may also receive, from a second device, second data representing a natural language input. The natural language processing system may determine a skill component is to execute with respect to the natural language input. The natural language processing system may send, to the skill component, second data representing the natural language input. The natural language processing system may receive, from the skill component, an indication that an ongoing first skill session with the second device has reached the first point. After receiving the indication and based at least in part on system usage data associated with at least one user, the natural language processing system may determine third data representing a prompt corresponding to the information and send, to the second device, the third data for output.

20 Claims, 14 Drawing Sheets

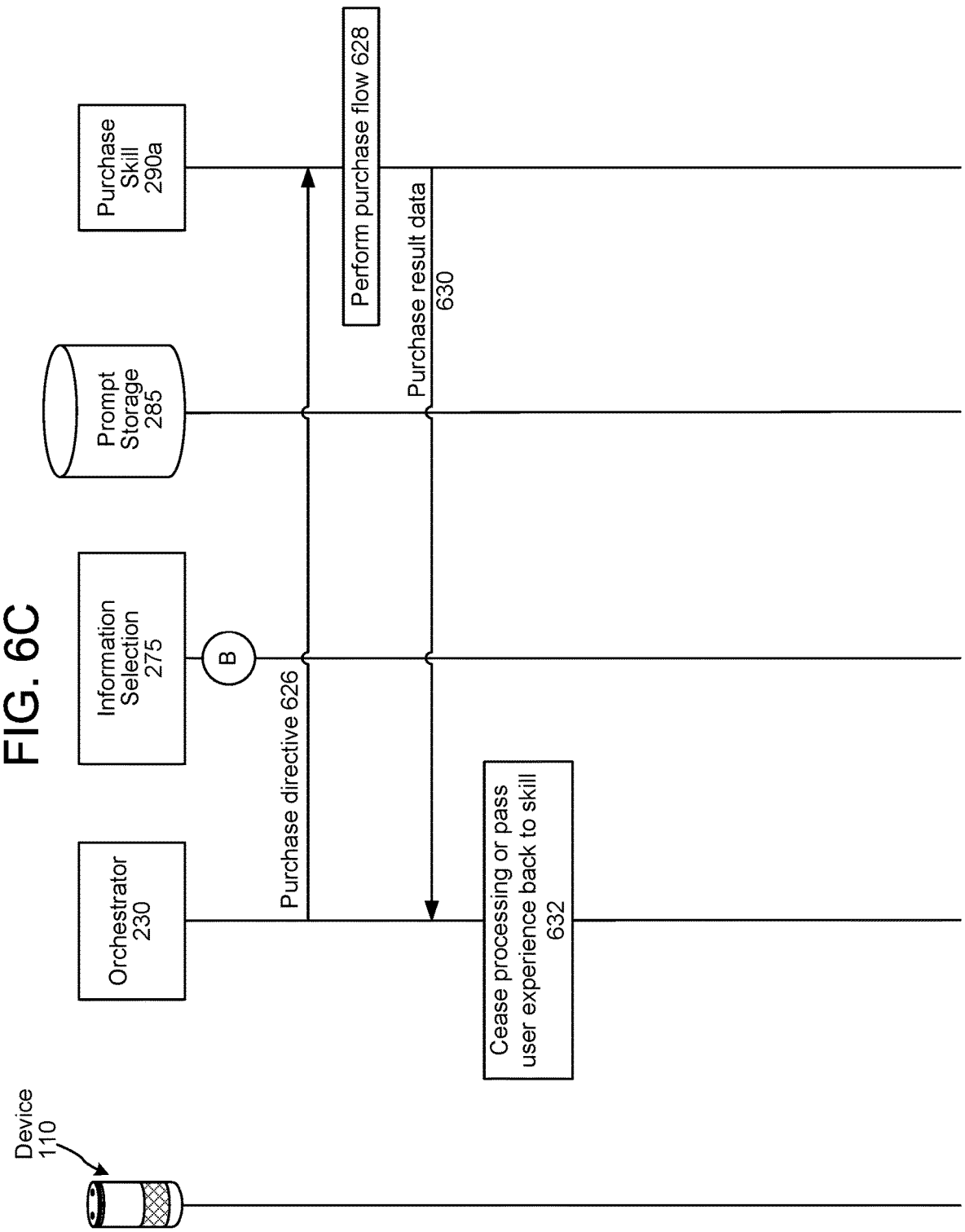

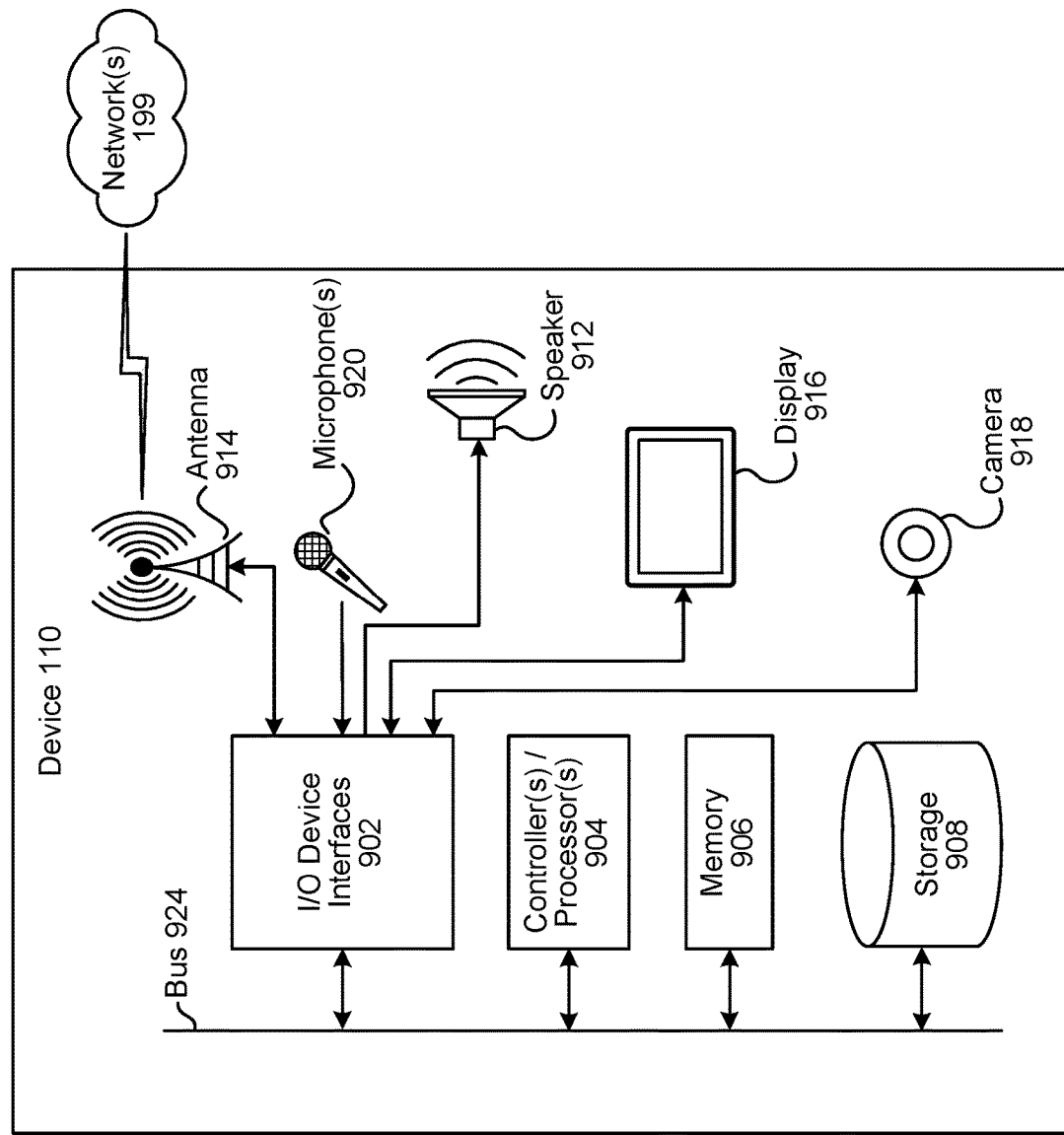

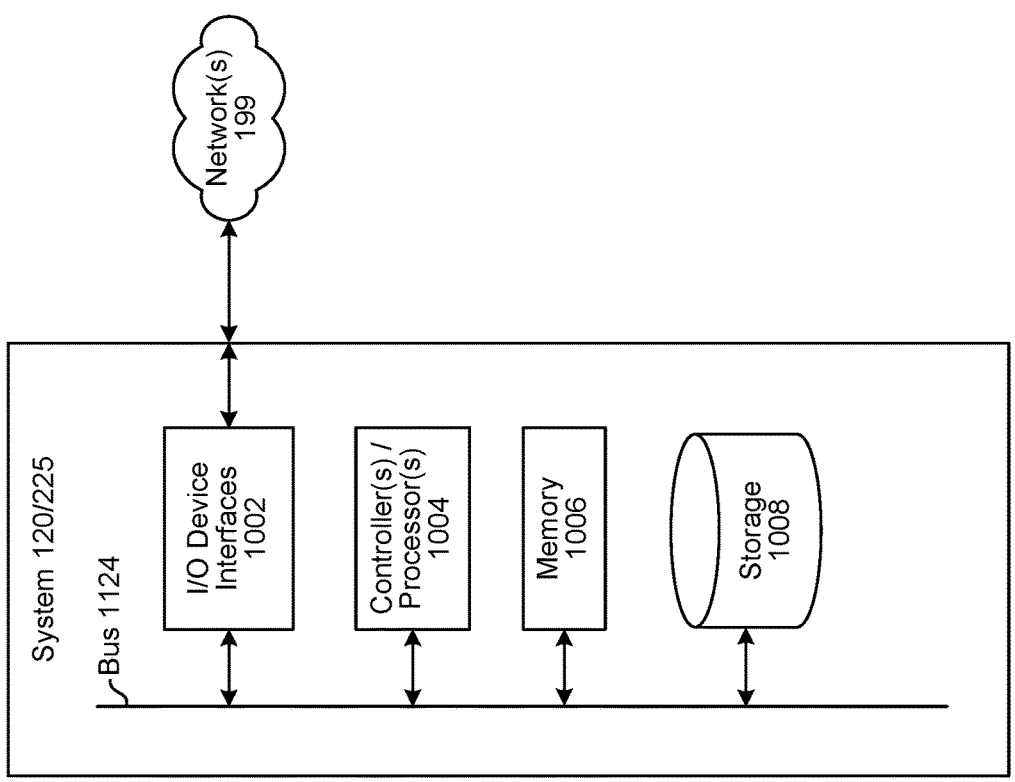

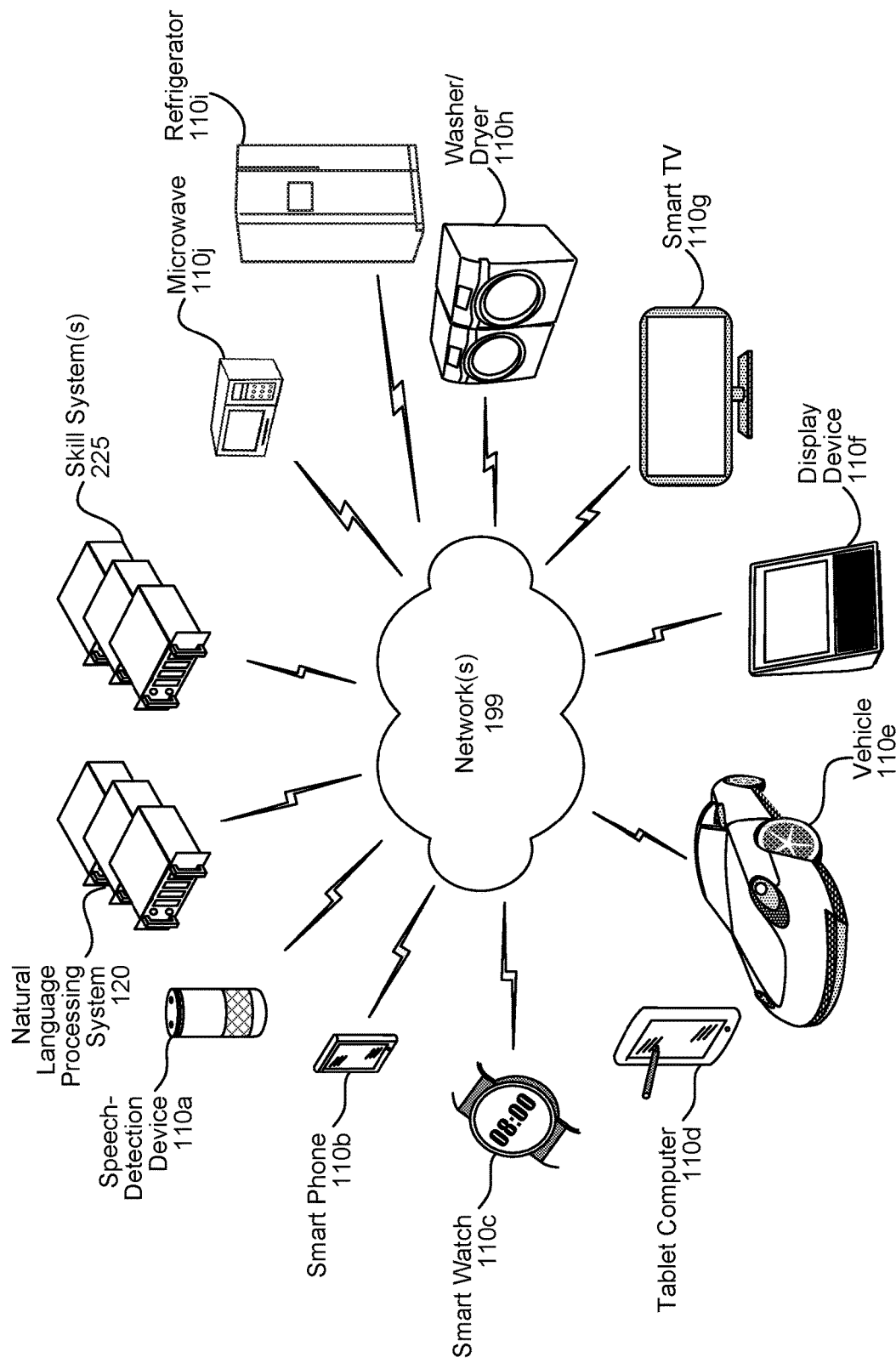

CONTEXTUAL CONTENT FOR VOICE USER INTERFACES

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 6A through 6C are a signal flow diagram illustrating how information may be output to a user, in accordance with embodiments of the present disclosure.

FIG. 9 is a block diagram conceptually illustrating example components of a device, in accordance with embodiments of the present disclosure.

FIG. 10 is a block diagram conceptually illustrating example components of a system, in accordance with embodiments of the present disclosure.

FIG. 11 illustrates an example of a computer network for use with the overall system, in accordance with embodiments of the present disclosure.

DETAILED DESCRIPTION

Figure 1:
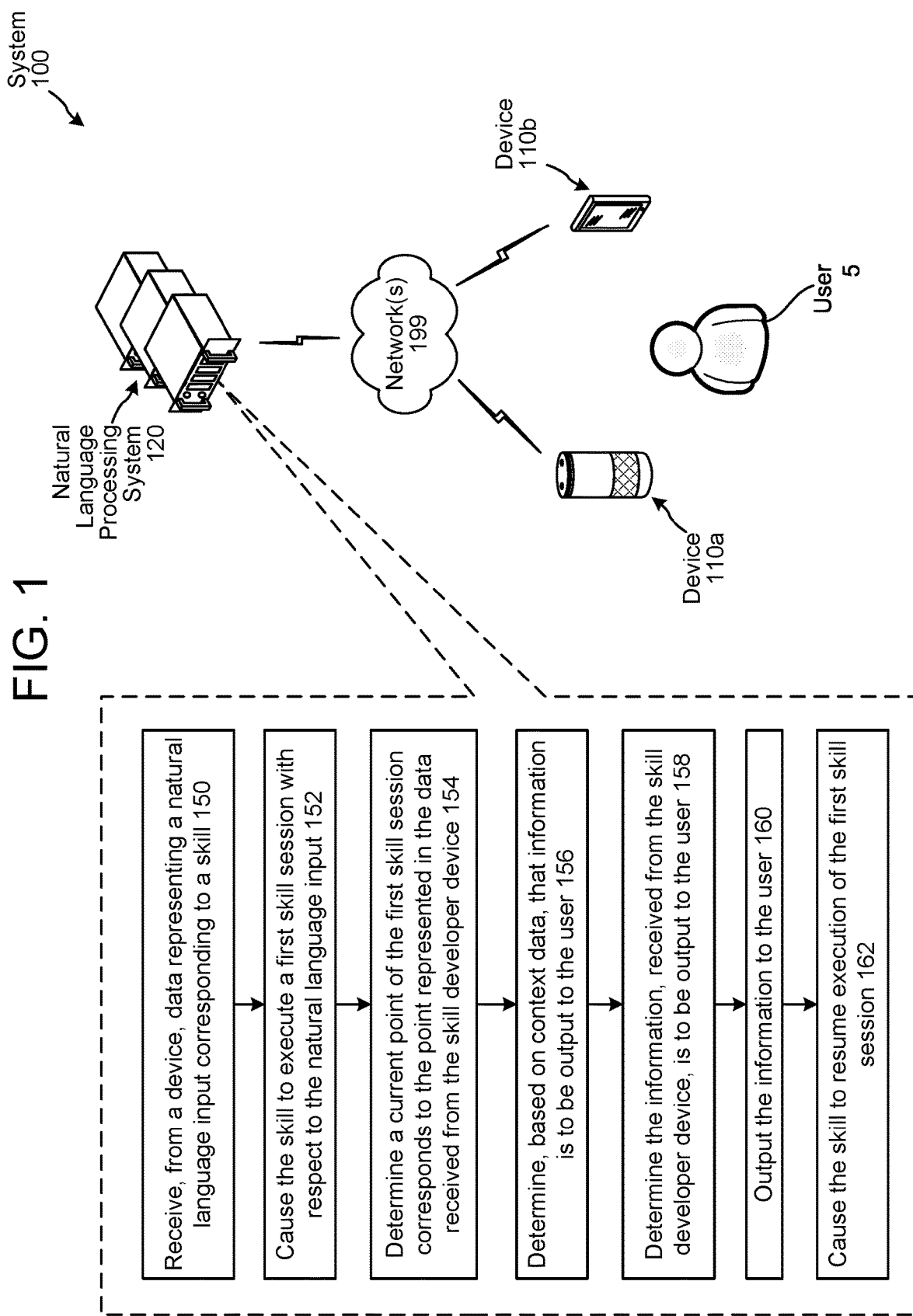
FIG. 1 is a conceptual diagram illustrating the system configured to output information to a user during execution of a skill session, in accordance with embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of computer science concerning transforming textual and/or other data into audio data that is synthesized to resemble human speech.

A system may cause skills to perform actions in response to natural language inputs (e.g., text/typed inputs and/or spoken inputs). For example, for the natural language input "play Adele music," a music skill may be invoked to output music sung by an artist named Adele. For further example, for the natural language input "turn on the lights," a smart home skill may be invoked to turn on "smart" lights associated with a user's profile. In another example, for the natural language input "book me a ride to my favorite restaurant," a ride sharing service's skill may be invoked to book a trip to the user's favorite restaurant (e.g., as represented in the user's profile), and the ride sharing service's skill may cause the system to output synthesized speech representing such booking. Actions, in the foregoing examples, correspond to the outputting of music, turning on of "smart" lights, and booking of the trip coupled with output of the synthesized speech. As such, as used herein, an "action" may refer to some result of a system's processing.

As used herein, a skill may refer to software, hardware, and/or firmware running on a system that enables the system to execute specific functionality in order to provide data or produce some other output in response to a natural language input. In at least some examples, a skill may be server-based. In at least some other examples, a skill may be akin to a software application running on a traditional computing device. Example skills may include weather information skills, music playing skills, or the like. The functionality described herein as a skill may be referred to using many different terms, such as an action, bot, app, or the like.

A skill may be created and altered by a skill developer. As used herein, a "skill developer" may refer to a user of a system that has specific permissions to generate and alter data to create and alter runtime functionality of a skill.

In at least some examples, a skill developer may provide a system with data representing information to be output to a user as part of the user's interaction with a skill. The information to be output may not be a response to a natural language input. For example, a skill developer may provide a system with data representing a user of a smart home skill is to receive information representing how the user may obtain a discount on a new smart home device. In another example, a skill developer may provide a system with data representing a user of a vehicle skill is to receive information representing how the user may obtain a discount on the user's next oil change. One skilled in the art will appreciate that the foregoing examples are not exhaustive, and that other examples are possible.

In at least some examples, a skill developer may, in addition to providing data representing information to be output, provide data representing when information is to be output to users of a skill. Such data may, in at least some examples, be rather rigid in that the data may represent the information is to be output at specific times. For example, a skill developer may indicate information is to be output each time a user has indicated the user has finished its present interaction with a skill. For further example, a skill developer may indicate information is to be output once during a free trial period of a service. In another example, a skill developer may indicate information is to be output when a user causes a skill to be invoked an nth time.

The present disclosure provides techniques for dynamically determining when information is to be output to a user, as well as what information is to be output to a user. The teachings of the present disclosure may limit when information is output to instances when the information is most likely to be relevant to the user. For example, a system may determine information representing a trial subscription to a service is not relevant to a user that is already a subscribing member of the service. For further example, this results in an improved user experience.

A system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

A skill developer may provide an input (e.g., typed input), to a skill developer device, representing information to be output to users of a skill. The skill developer device may generate first data representing the information to be output to users and including a skill identifier corresponding to the skill. The skill developer device may send the first data to the natural language processing system 120.

The skill developer may also provide an input (e.g., typed input), to the skill developer device, representing a point, in a skill session, when information is to be output to users of the skill. As used herein, a "point" in a skill session may refer to after the natural language processing system 120 receives a natural language input to be processed by the skill but prior to the natural language processing system 120 invoking the skill to execute, may refer to after a user has indicated the user no longer desired to interact with the skill (e.g., after the user provides a natural language input representing the user wants to end the skill session), may refer to a duration of a skill session (e.g., after the skill session has been occurring for a minute), may refer to a number of natural language inputs of a skill session (e.g., after the user has provided 3 natural language inputs as part of the skill session), or may refer to some other developer definable and natural language processing system understandable point in a skill session. In at least some examples, a duration of a skill session may be tracked by a natural language processing system and/or a skill system executing with respect to the skill session. A natural language processing system may measure a duration of a skill session starting from when the natural language processing system receiving a first natural language input of the skill session. A skill system may measure a duration of a skill session starting from when the skill system is first called by a natural language processing system to execute with respect to the skill session.

As used herein, "skill session" may refer to data transmissions (such as relating to multiple natural language inputs and skill outputs) between a skill and a device(s) that all relate to a single originating natural language input. Thus, the data transmissions of a skill session may be associated with a same skill session identifier. The skill session identifier may be used by components of the overall system 100 to track information across the skill session. For example, a device may send the natural language processing system 120 data corresponding to "Alexa, play jeopardy." The natural language processing system 120 may invoke a gaming skill to play the game jeopardy. As part of playing jeopardy, the gaming skill may send, to the device via the natural language processing system 120, data corresponding to a jeopardy statement to be output to a user(s). A user may then respond to the statement, which the device sends as data to the natural language processing system 120, which sends the data to the gaming skill. The sending of data from the device to the natural language processing system 120 (and ultimately the gaming skill) and the sending of data from gaming skill to the natural language processing system 120 (and ultimately to the device) may all correspond to a single skill session identifier. In some examples, a skill session-initiating natural language input may start with a wakeword and end with a command, such as "Alexa, play jeopardy," where "Alexa" is the wakeword and "play jeopardy" is the command. Subsequent natural language inputs of the same skill session may start with speaking of a wakeword. Each natural language input of a skill session may be associated with a unique natural language input identifier such that multiple natural language input identifiers may be associated with a single skill session identifier.

The skill developer device may generate second data representing the point in the skill session when information is to be output to users of the skill, and including the skill identifier corresponding to the skill. The skill developer device may send the second data to the natural language processing system 120.

The natural language processing system 120 may associate the information, to be output to users of the skill, with the skill's identifier in storage. The natural language processing system 120 may also associate the point, when information is to be output, with the skill's identifier in storage.

FIG. 1 shows the system 100 configured to output information to a user during execution of a skill session. Although the figures and discussion of the present disclosure illustrate certain steps in a particular order, the steps described may be performed in a different order (as well as certain steps removed or added) without departing from the present disclosure. As shown in FIG. 1, the system 100 may include one or more devices (110a/110b), local to a user 5, in communication with a natural language processing system 120 across one or more networks 199.

After the natural language processing system 120 associates the information and point with the skill identifier in storage(s) (as described above), the device 110a may receive audio corresponding to a spoken natural language input (corresponding to the skill) originating from the user 5. The device 110a may generate audio data corresponding to the audio and may send the audio data to the natural language processing system 120. Alternatively, the device 110b may receive a text/typed natural language input (corresponding to the skill) from the user 5. The device 110b may generate text data corresponding to the text/typed input and may send the text data to the natural language processing system 120. Alternatively, the device 110b may detect a touch event corresponding to a portion of the device 110b's display presenting a natural language input (e.g., in the form of a virtual button, selectable text, etc.). The device 110b may generate text data corresponding to the natural language input and may send the text data to the natural language processing system 120.

The device 110 may send the audio data and/or the text data to the natural language processing system 120 via a companion application installed on the device 110. A companion application may enable the device 110 to communicate with the natural language processing system 120 via the network(s) 199. An example companion application is the Amazon Alexa application that may be installed on a smart phone, tablet, or the like.

The natural language processing system 120 may receive (150) data representing the natural language input. The third data may be audio data when the natural language input is a spoken natural language input. The third data may be text data when the natural language input is a text/typed natural language input.

The natural language processing system 120 may cause (152) the skill to execute a first skill session with respect to the natural language input. The may include the natural language processing system 120 sending, to the skill, data representing a determined intent of the user and one or more named entities represented in the natural language input. Such data may be generated as a result of NLU processing or SLU processing as described herein.

At some point during the first skill session, the natural language processing system 120 may determine (154) a current point of the first skill session corresponds to the point represented in the data received from the skill developer device. After the natural language processing system 120 determines the current point corresponds to the stored point, the natural language processing system 120 may determine (156), based on context data, that information is to be output to the user. A non-limiting list of context data that may be considered includes a time of day, a history representing information previously output to the user, data representing when other users of the natural language processing system 120 have requested further information regarding output information, etc.

After the natural language processing system 120 determines information is to be output to the user 5, the natural language processing system 120 may determine (158) the information, received from the skill developer device, is to be output to the user 5 based at least in part on the information being associated with the skill identifier in storage. The natural language processing system 120 may thereafter output (160) the information to the user 5. After outputting the information to the user 5, the natural language processing system 120 may cause (162) the skill to resume execution of the first skill session.

Figure 2:
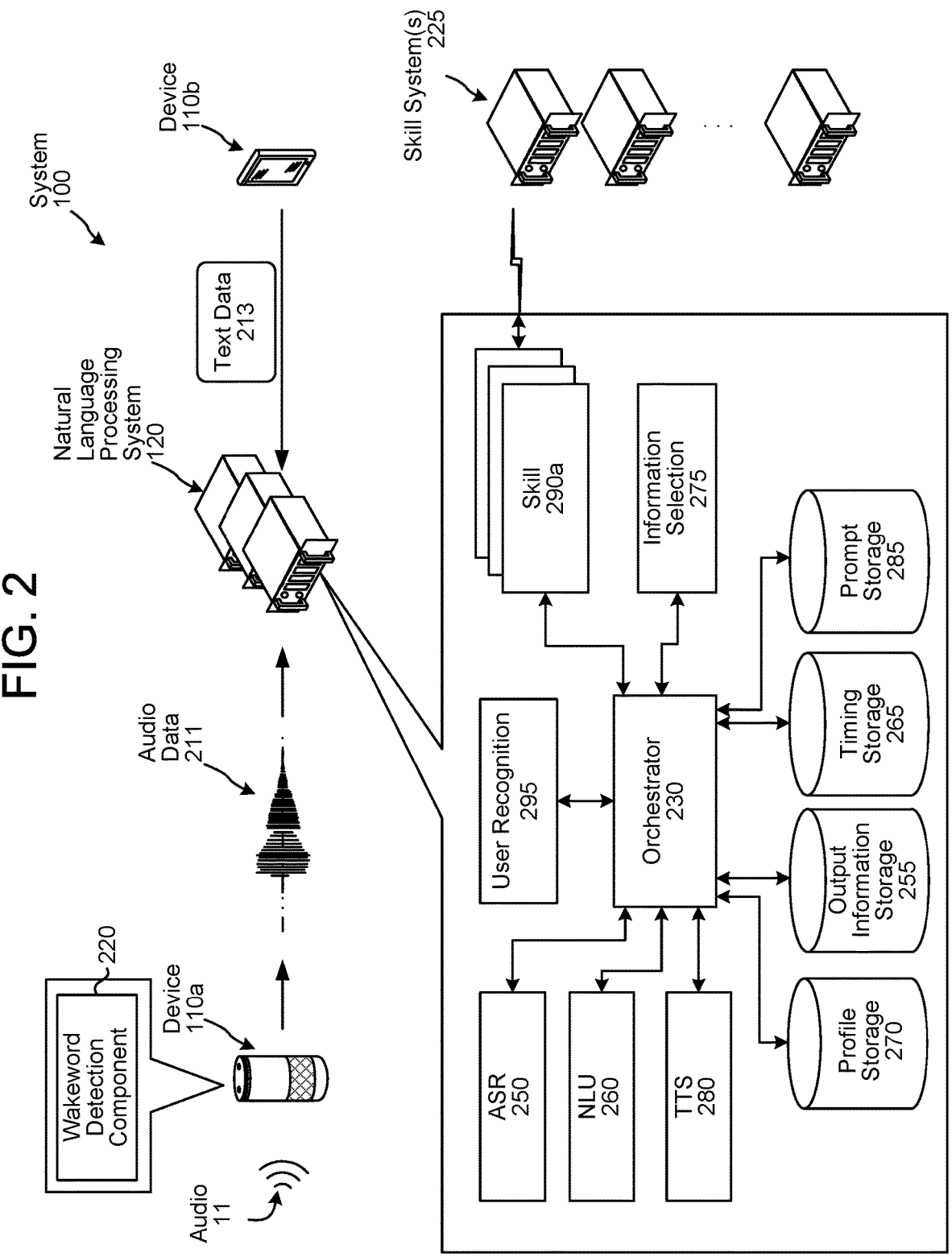
FIG. 2 is a conceptual diagram of components of the system, in accordance with embodiments of the present disclosure.

The system 100 may operate using various components as described in FIG. 2. The various components may be located on a same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the natural language processing system 120. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 211, representing the audio 11, to the natural language processing system 120. The audio data 211 may include data corresponding to the wakeword, or the device 110a may remove the portion of the audio corresponding to the wakeword prior to sending the audio data XAA11 to the natural language processing system 120.

An orchestrator component 230 may receive the audio data 211. The orchestrator component 230 may include memory and logic that enables the orchestrator component 230 to transmit various pieces and forms of data to various components of the system 100, as well as perform other operations.

The orchestrator component 230 may send the audio data 211 to an ASR component 250. The ASR component 250 transcribes the audio data 211 into ASR results data (e.g., text data). The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 110b may receive a text/typed natural language input. The device 110b may generate text data 213 representing the text/typed natural language input. The device 110b may send the text data 213 to the natural language processing system 120. The orchestrator component 230 may receive the text data 213.

The orchestrator component 230 may send text data (e.g., text data output by the ASR component 250 or the received text data 213) to an NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the natural language processing system 120, a skill, a skill system, etc.) to execute the intent. For example, if the text data corresponds to "play Adele music," the NLU component 260 may determine an intent that a skill output music and may identify "Adele" as an artist. For further example, if the text data corresponds to "what is the weather," the NLU component 260 may determine an intent that a skill output weather information associated with a geographic location of the device 110. In another example, if the text data corresponds to "turn off the lights," the NLU component 260 may determine an intent that a skill turn off lights associated with the device 110 and/or the user 5. The NLU component 260 may output NLU results data (which may include tagged text data, indicators of intent, etc.).

As described above, the natural language processing system 120 may perform speech processing using two different components (e.g., the ASR component 250 and the NLU component 260). One skilled in the art will appreciate that the natural language processing system 120, in at least some examples, may implement a spoken language understanding (SLU) component that is configured to process audio data 211 to generate NLU results data.

In some examples, the SLU component may be equivalent to the ASR component 250 and the NLU component 260. For example, the SLU component may process audio data 211 and generate NLU data. The NLU data may include intent data and/or slot data so that directives may be determined based on the intent data and/or the slot data. While the SLU component may be equivalent to a combination of the ASR component 250 and the NLU component 260, the SLU component may process audio data 211 and directly generate the NLU data, without an intermediate step of generating text data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive a desired action. In some examples, the SLU component outputs a most likely NLU response (e.g., hypothesis) recognized in the audio data 211, or multiple hypotheses in the form of a lattice or an N-best list with individual hypotheses corresponding to confidence scores or other scores (such as probability scores, etc.).

The natural language processing system 120 may include one or more skills 290 configured to execute with respect to NLU results data (or data representing NLU results data). For example, a weather skill may enable the natural language processing system 120 to output weather information, a car service skill may enable the natural language processing system 120 to book a trip with respect to a taxi or ride sharing service, a restaurant skill may enable the natural language processing system 120 to order a pizza with respect to the restaurant's online ordering system, etc. A skill 290 may operate in conjunction between the natural language processing system 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the natural language processing system 120, a skill 290 may be implemented by a skill system 225. Such may enable a skill system 225 to execute specific functionality in order to provide data or perform some other action requested by a user.

A skill may be associated with a domain, such as a smart home domain, a music domain, a video domain, a flash briefing domain, a shopping domain, and/or a custom domain.

The natural language processing system 120 may be configured with a single skill 290 dedicated to interacting with more than one skill system 225.

The natural language processing system 120 may include a TTS component 280. The TTS component 280 may generate audio data (e.g., synthesized speech) from text data using one or more different methods. Text data input to the TTS component 280 may come from a skill 290, the orchestrator component 230, or another component of the natural language processing system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The natural language processing system 120 may include a user recognition component 295. In at least some examples, the user recognition component 295 may be implemented as a skill 290, or as part of a skill system 225.

The user recognition component 295 may recognize one or more users using a variety of data. The user recognition component 295 may take as input the audio data 211 and/or the text data 213. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, etc.), received by the natural language processing system 120 in correlation with a natural language input, to stored biometric data of users. The user recognition component 295 may additionally or alternatively perform user recognition by comparing image data (e.g., including a representation of at least a feature of a user), received by the natural language processing system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition operations.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill 290 or skill system 225, as well as processing performed by other components of the natural language processing system 120 and/or other systems.

The natural language processing system 120 may include profile storage 270. The profile storage 270 may include a variety of information related to individual users, groups of users, devices, etc. that interact with the natural language processing system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the natural language processing system 120 with permission to allow the skill to execute with respect to the user's inputs. If a user does not enable a skill, the natural language processing system 120 may not permit the skill to execute with respect to the user's inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

Figure 3:
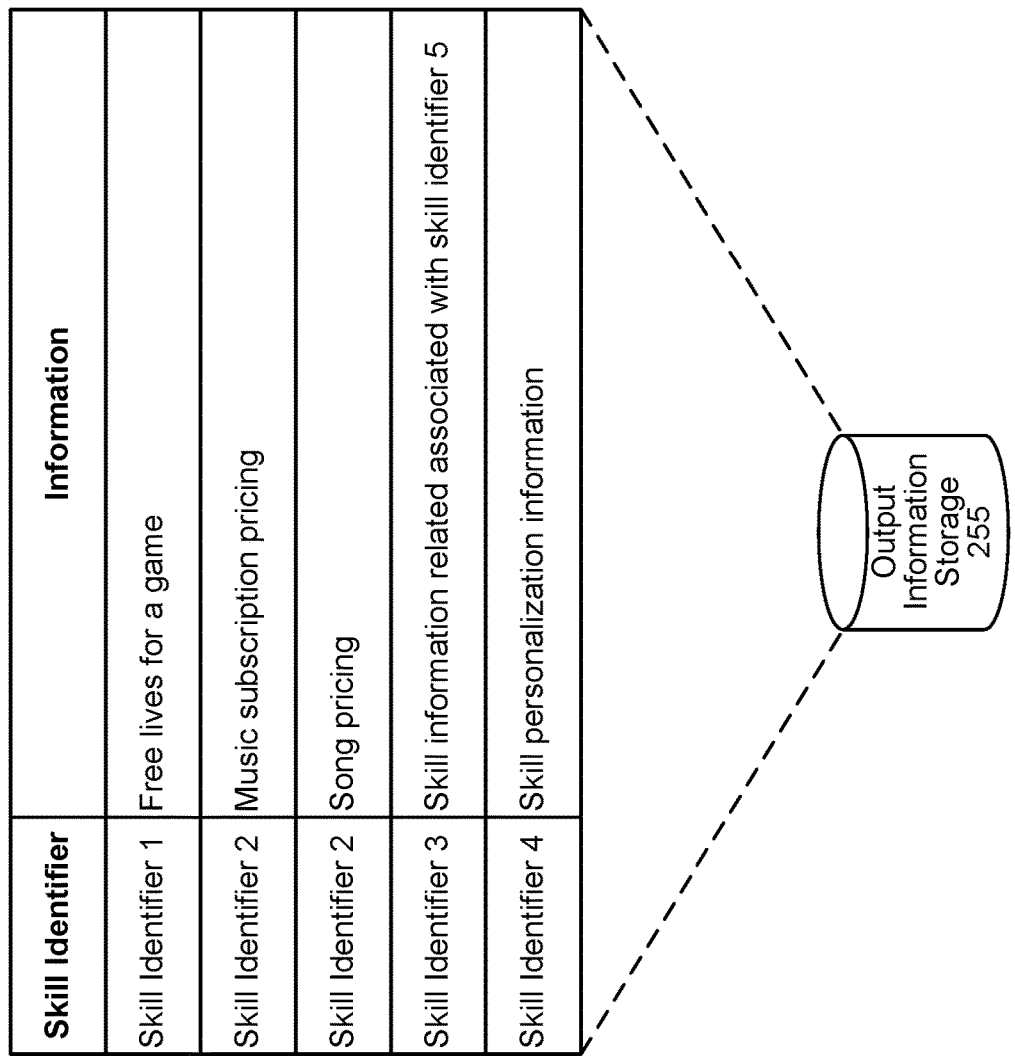
FIG. 3 illustrates data stored in an information output storage, in accordance with embodiments of the present disclosure.

The natural language processing system 120 may include an output information storage 255. As described, a skill developer device may send, to the natural language processing system 120, data representing information to be output to users of a skill, and that such data may include the skill's identifier. The natural language processing system 120 may associate the received information and corresponding skill identifier in the output information storage 255 (as illustrated in FIG. 3). A skill identifier may be associated with a single piece of information (e.g., skill identifiers 1, 3, and 4 in FIG. 3) or more than one piece of information (e.g., skill identifier 2 in FIG. 3).

Figure 4:
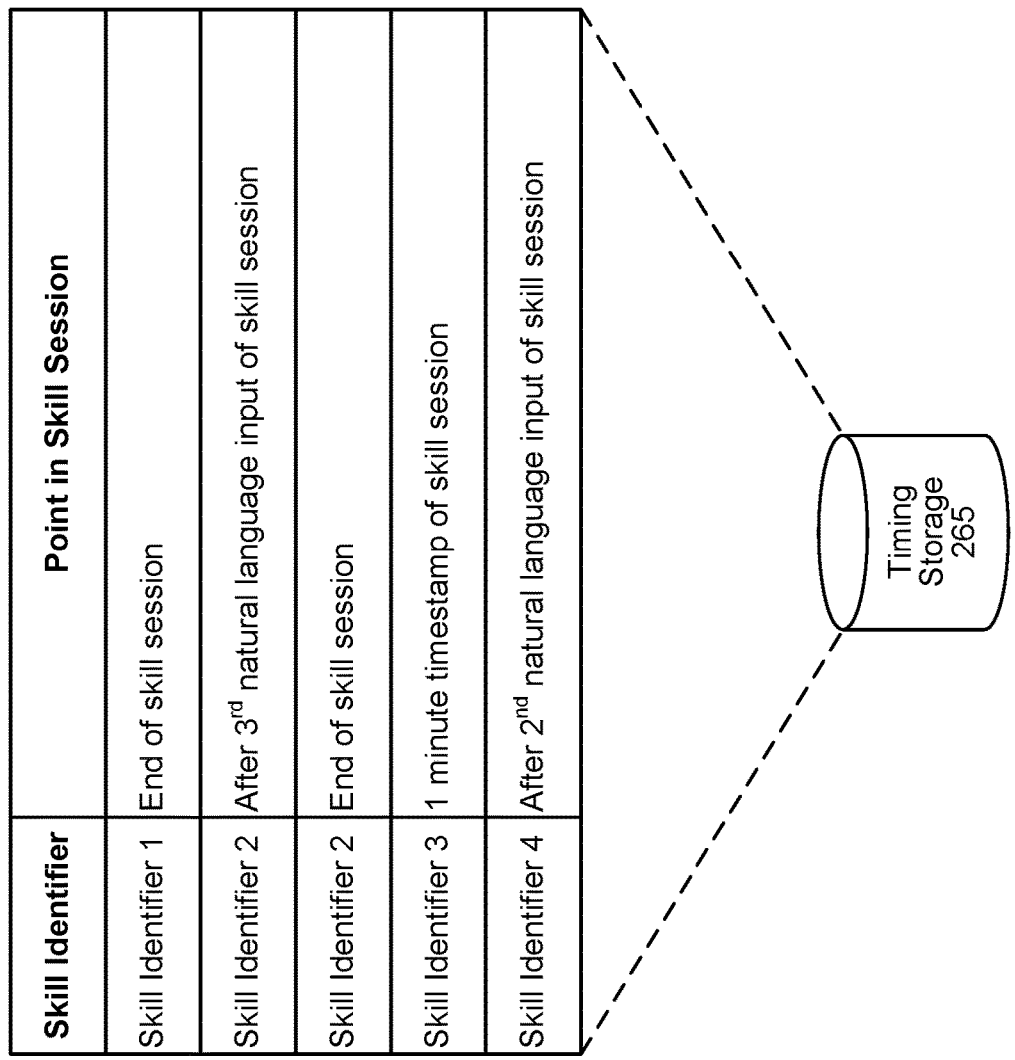
FIG. 4 illustrates data stored in a timing storage, in accordance with embodiments of the present disclosure.

The natural language processing system 120 may include a timing storage 265. As described, a skill developer device may send, to the natural language processing system 120, data representing a point, in a skill session, when information is to be output to users of a skill, and that such data may include the skill's identifier. The natural language processing system 120 may associate the received point in the skill session and corresponding skill identifier in the timing storage 265 (as illustrated in FIG. 4). A skill identifier may be associated with a single point in a skill session (e.g., skill identifiers 1, 3, and 4 in FIG. 4) or more than one point in a skill session (e.g., skill identifier 2 in FIG. 4).

As described above, a skill 290 may be invoked to execute with respect to an intent and one or more named entities determined from NLU processing or SLU processing. When a skill 290 is invoked, the natural language processing system 120 may generate a skill session identifier and associate the skill session identifier with the data sent to the skill 290.

As also described above, a skill session may occur over a duration of time, and may include various natural language inputs and corresponding skill outputs. At some point during the skill session, the skill 290 executing with respect to the skill session identifier (or another component of the natural language processing system 120, such as the orchestrator component 230) may determine a present point in the skill session corresponds to a skill session point represented in the timing storage 265.

For example, the skill 290 may be configured to read payload data and/or corresponding metadata to determine a present point of the skill session. For example, the skill 290 may determine payload data represents a natural language input to end a skill session. Such may include the skill 290 determining the payload data includes a <Cancel> NLU intent or other like NLU intent. For further example, the skill 290 may read metadata to determine a present natural language input (represented in payload data corresponding to the currently being read metadata) corresponds to a nth natural language input of the skill session. In another example, the skill 290 may read metadata to determine a length of time that the skill session has been ongoing. One skilled in the art will appreciate that the foregoing capabilities of the skill 290 are illustrative, and that the skill 290 may be configured to read payload data and/or metadata for the purpose of determining additional or other points in skill sessions that may be represented in the timing storage 265.

Figure 5:
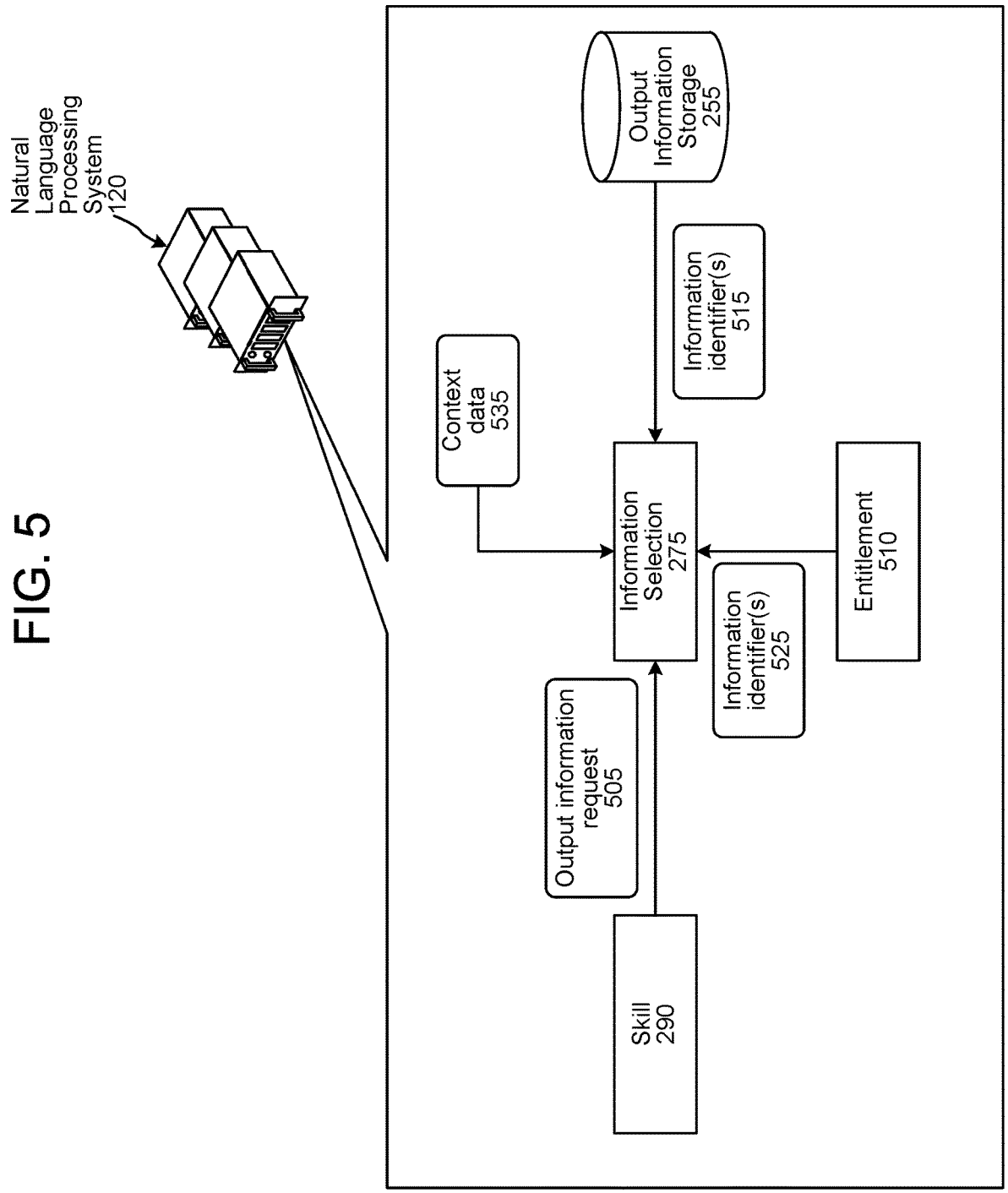
FIG. 5 is a conceptual diagram illustrating how an information selection component may determine when information is to be output to a user, and what information to output to the user, in accordance with embodiments of the present disclosure.

The skill 290 may determine whether the determined present point of the skill session is associated with the skill's identifier in the timing storage 265. If the skill 290 determines the present point in the skill session corresponds to a point in a skill session associated with the skill's identifier in the timing storage 265 (e.g., corresponding to a point in a skill session a skill developer has indicated information is to be output to the user), the skill 290 may send, to an information selection component 275 of the natural language processing system 120, an output information request 505 (as illustrated in FIG. 5). The output information request 505 may include, for example, the skill's identifier, a domain to which the skill identifier is associated, the skill session identifier, a user identifier (representing the user providing the natural language input(s) of the skill session), and/or a device identifier (representing the device 110 that captured the natural language input(s) of the skill session).

Users of the natural language processing system 120 may provide the natural language processing system 120 with personal information. A user's personal information may be used, with user permission, to determine when information, provided by a skill developer, is to be output to the user. The natural language processing system 120 may not share a user's personal information with skill developers, thereby restricting skill developers' knowledge as to when is a most appropriate time to output information to a user. An information selection component 275 (of the natural language processing system 120) may have access to user personal information and other data points not available to a skill developer, thereby making the information selection component 275 a better determiner as to when information should, in fact, be output to a user, as well as what information to output.

The information selection component 275 may be configured to only process with respect to user identifiers and device identifiers associated with data representing a user has provided permission for the information selection component 275 to output information to the user. Such data may be stored in a profiles corresponding to user identifier and device identifiers in the profile storage 270.

When the information selection component 275 is so configured, as an initial step, the information selection component 275 may query the profile storage 270 with respect to the user identifier and/or device identifier represented in the output information request 505. If the user identifier and/or device identifier is not associated with data representing a user has provided permission for the information selection component 275 to process, the query may return "no matching search results" data representing the query was unable to identify data, associated with the user identifier and/or device identifier, representing a user has provide permission for the information selection component 275 to process. When the information selection component 275 receives such data, the information selection component 275 may determine whether the present point in the skill session (represented in the output information request 505) represents the end of the skill session. If the information selection component 275 determines the present point in the skill session corresponds to the end of the skill session, the information selection component 275 may simply cease processing (or output data indicating the skill session is to be ended). Conversely, if the information selection component 275 determines the present point in the skill session did not correspond to the end of the skill session (e.g., corresponded to an nth natural language input of the skill session, represented the skill session had transpired for n amount of time, etc.), the information selection component 275 may send, to the skill 290, data representing the skill 290 is to recommence processing with respect to the skill session. This data may effectively pass the user experience back to the skill 290.

Alternatively, if the user identifier and/or device identifier is/are associated with data representing a user has provided permission for the information selection component 275 to process, the query may return "confirmation" data representing the query was able to identify data, associated with the user identifier and/or device identifier, representing a user has provide permission for the information selection component 275 to process. When the information selection component 275 receives such data, the information selection component 275 may query the output information storage 255 for information associated with the skill identifier represented in the output information request 505. Each piece of information, in the output information storage 255, may be associated with a respective information identifier. When the output information storage 255 stores information identifiers, querying of the output information storage 255 may result in the information selection component 275 receiving one or more information identifiers 515 associated with the skill identifier in the output information storage 255.

Some information may correspond to something that may be purchased by a user (e.g., lives for a gaming skill, a music subscription, etc.). It may be undesirable to output information, pertaining to a purchasable item, that the user has already purchased (e.g., an undesirable user experience may result from outputting information specific to a music subscription when the user has already purchased the music subscription). To this end, after receiving the information identifier(s) 515, the information selection component 275 may query an entitlement component 510 to determine which of the information identifier(s) 515, corresponding to purchasable items, the user (corresponding to the user identifier) has already purchased. Specifically, the information selection component 275 may send, to the entitlement component 510, the information identifier(s) 515, and the user identifier (represented in the output information request 505) and/or the device identifier (represented in the output information request 505).

The entitlement component 510 may query a storage, including user identifiers and/or device identifiers associated with information identifiers corresponding to purchased items, to determine if the information identifier(s) 515 is associated with the user identifier (represented in the output information request 505) and/or the device identifier (represented in the output information request 505). If the entitlement component 510 determines none of the information identifier(s) 515 is/are associated with the user identifier or the device identifier, the entitlement component 510 may send, to the information selection component 275, "no matching search results" data. Conversely, if the entitlement component 510 determines one or more of the information identifier(s) 515 is associated with the user identifier or the device identifier in the storage, the entitlement component 510 may send, to the information selection component 275, the determined information identifier(s) 525.

The information selection component 275 may receive various context data 535 for determining whether information is to be output to the user, as well as determine which information (corresponding to information identifier(s) 515 minus the information identifier(s) 525) is to be output to the user. The information selection component 275 may be configured to prevent information from being output to the user if the information has been output to the user within a threshold amount of time. To this end, the information selection component 275 may receive and analyze context data 535 representing information identifiers corresponding to information that has been output to the user within the threshold amount of time.

The information selection component 275 may additionally or alternatively be configured to prevent information from being output to the user if the user has rejected the information within a threshold amount of time. Such a user rejection may be embodied as negative user feedback indicating the user was unhappy with the output of the information, may be embodied as a user declination to purchase an item if the information queried the user to purchase the item, or may be embodied in some other form. To this end, the information selection component 275 may receive and analyze context data 535 representing information identifiers corresponding to information that has been rejected by the user within the threshold amount of time.

The information selection component 275 may additionally or alternatively be configured to prevent information from being output to the user if the user has rejected the information at least a threshold number of times. To this end, the information selection component 275 may receive and analyze context data 535 representing information identifiers corresponding to information that has been rejected by the user at least a threshold number of times.

The information selection component 275 may be configured to output information, associated with a skill, based on users accepting information output with respect to other skills. A user's acceptance of output information may be embodied as positive user feedback indicating the user was happy with the output of the information, may be embodied as a user acceptance to purchase an item if the information queried the user to purchase the item, may be embodied as the user requesting further information with respect to the output information, or may be embodied in some other form. The natural language processing system 120 may determine, based on acceptances of information output with respect to various skills, a number of times a skill is to be invoked by a user prior to the natural language processing system 120 having the greatest confidence that a user will accept output information. For example, the natural language processing system 120 may determine a user is most likely to accept information, output with respect to a skill, after the user has invoked the skill 2 times (e.g., caused the skill to perform two different skill sessions with the user). Context data 535 may represent an optimal number of skill invocations as determined by the natural language processing system 120. The context data 535 may also include information representing a number of times the user (corresponding to the user identifier represented in the output information request 505) has invoked the skill 290. The information selection component 275 may analyze the two pieces of foregoing context data 535 to determine whether the user has invoked the skill 290 at least the optimal number of times. This determination may be used to inform the information selection component 275's overall determination as to whether information is to be output to the user.

Users in different geographic regions may have different propensities of accepting output information. The context data 535 may include a geographic region associated with the user identifier (represented in the output information request 505) and/or the device identifier (represented in the output information request 505) in the profile storage 270. The information selection component 275 may consider the geographic region, represented in the context data 535, when determining whether to output information to the user.

Users of different ages may have different propensities of accepting output information. The context data may include an age associated with the user identifier (represented in the output information request 505) and/or the device identifier (represented in the output information request 505) in the profile storage 270. The information selection component 275 may consider the age, represented in the context data 535, when determining whether to output information to the user.

A user's gender may be indicative of the user's propensity to accept output information. The context data may include a gender associated with the user identifier (represented in the output information request 505) and/or the device identifier (represented in the output information request 505) in the profile storage 270. The information selection component 275 may consider the gender, represented in the context data 535, when determining whether to output information to the user.

The information selection component 275 may additionally or alternatively receive and analyze context data 535 representing whether a profile (associated with the user identifier represented in the output information request 505) includes data representing the user is subscribed to a pay-for service provided by the system 100, a price of an item corresponding to information to be output, a type of the information to be output (e.g., whether the information corresponds to a one-time purchase of an item, whether the information corresponds the purchase of a subscription, etc.), whether other users of the same skill have accepted or rejected the output information, and/or other context information that may be used in determining whether information is to be output to the user, as well as what information to output.

The information selection component 275 may implement one or more trained machine learning models to determine whether information is to be output to the user, as well as what information to output. In at least some examples, the trained machine learning model(s) may be a non-deterministic model(s). The information (corresponding to information identifier(s) 515 minus the information identifier(s) 525) and the various context data 535 described herein may be input to the model(s). The model(s) may process the various inputs and output an indicator represent whether information is to be output.

The machine learning model(s), implemented by the information selection component 275, may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The model(s), implemented by the information selection component 275, may apply weights to the different data points input to the model(s). In at least some examples, the weights may be configured based on the skill 290 that sent the output information request 505 to the information selection component 275. For example, a first skill may be associated with a first set of weights, a second skill may be associated with a second set of weights, etc. In at least some examples, weights, associated with a skill, may be provided by a skill developer of the skill through the skill developer's device. In at least some examples, machine learning may be used to determine weights to be applied by the model(s). Such machine learning may consider previous instances when information was output and a user rejected the information, previous instances when information was output and a user accepted the information, and context data corresponding to each of the previous instances.

If the indicator represents information is not to be output, the information selection component 275 may determine whether the present point in the skill session (represented in the output information request 505) represents the end of the skill session. If the information selection component 275 determines the present point in the skill session corresponds to the end of the skill session, the information selection component 275 may simply cease processing (or output data indicating the skill session is to be ended). Conversely, if the information selection component 275 determines the present point in the skill session did not correspond to the end of the skill session (e.g., corresponded to an nth natural language input of the skill session, represented the skill session had transpired for n amount of time, etc.), the information selection component 275 may send, to the skill 290, data representing the skill 290 is to recommence processing with respect to the skill session. This data may effectively pass the user experience back to the skill 290.

Figure 6A:
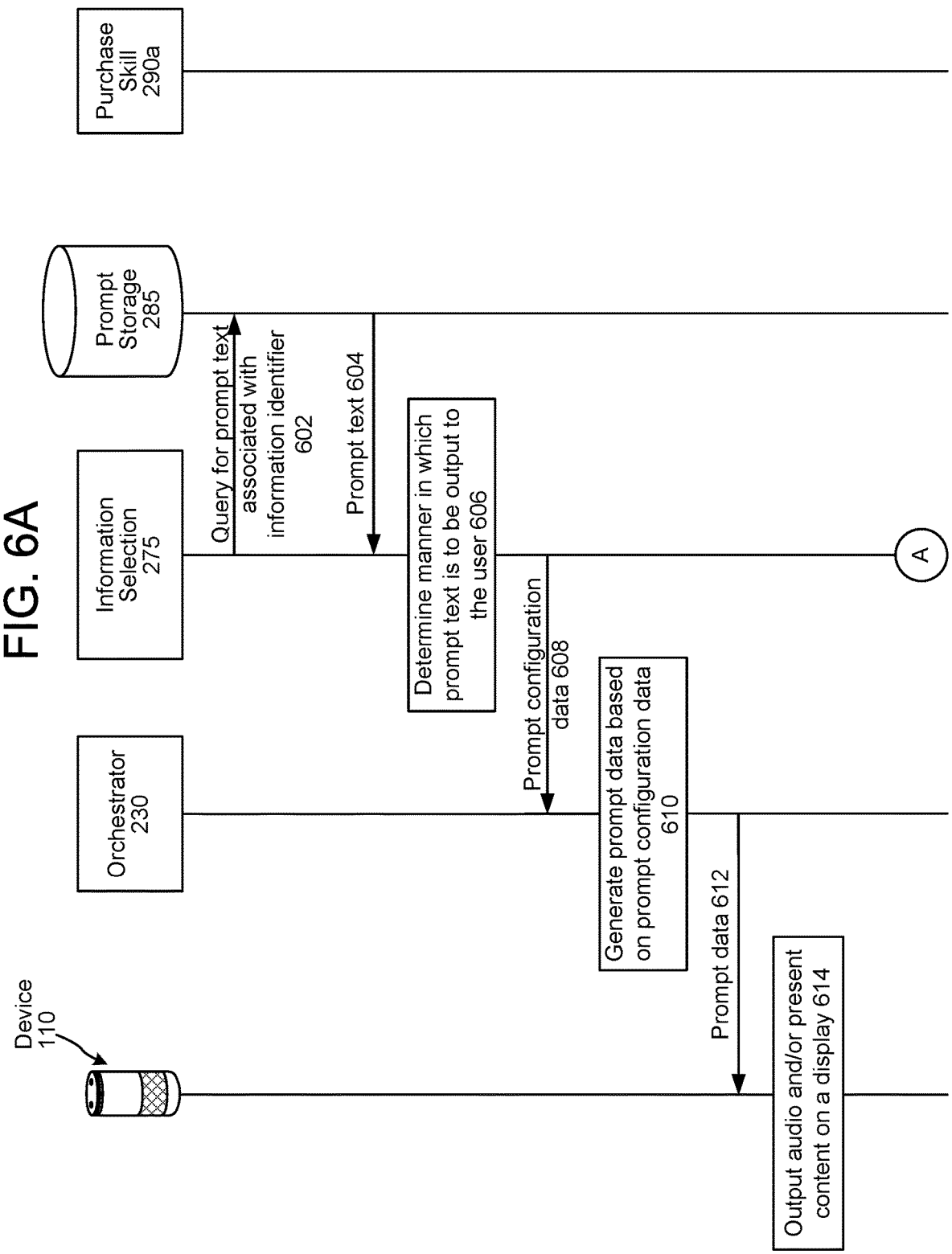
Figure 6B:
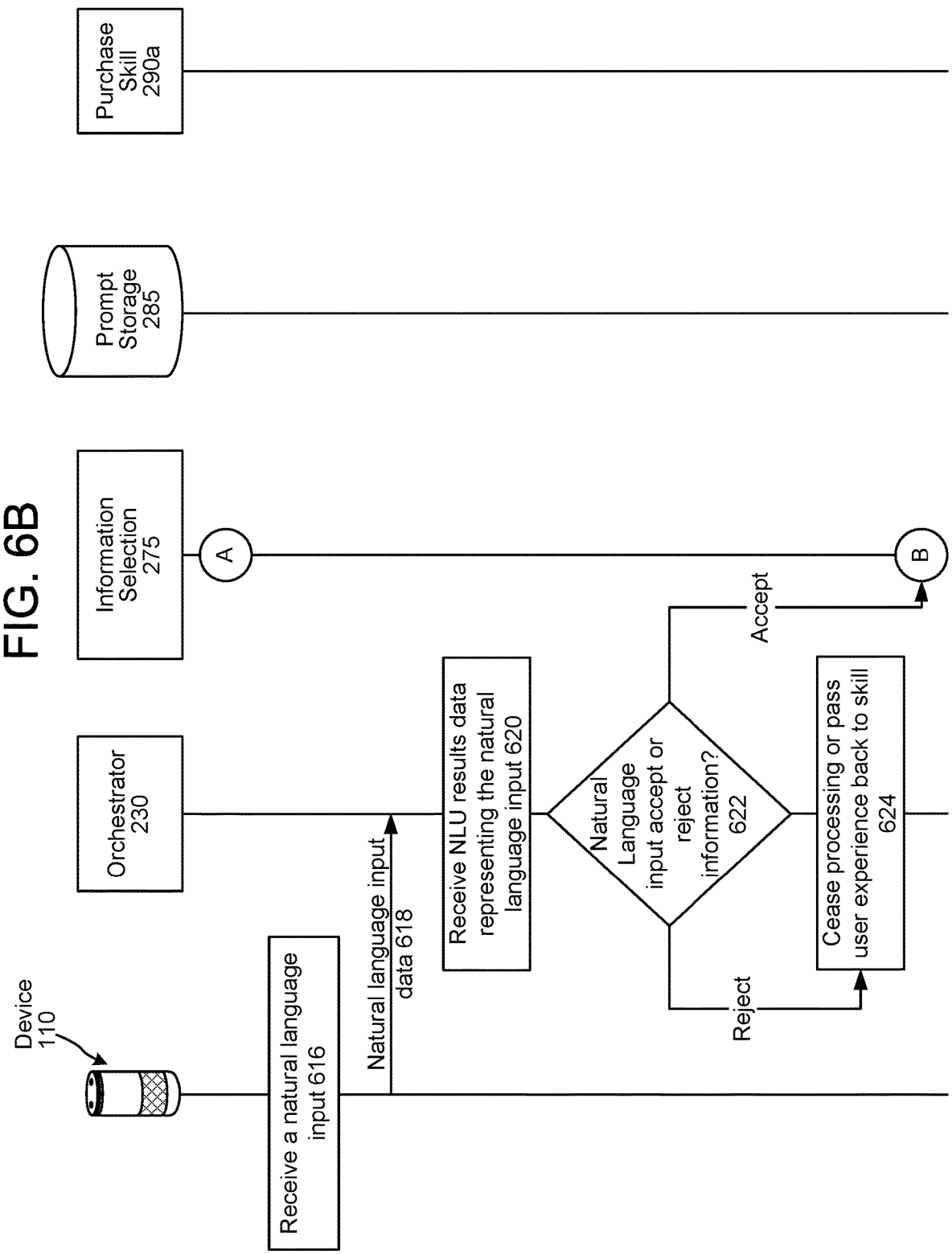

If the indicator represents information is to be output, the model(s) may also output an information identifier corresponding to the information to be output to the user. After the model(s) outputs the indicator (representing information is to be output) and the information identifier, the information selection component 275 may determine how the information is to be output. To this end, the information selection component 275 may query (602 as illustrated in FIG. 6A) a prompt storage 285 for prompt text associated with the information identifier (corresponding to the information to be output). Generally, the prompt storage 285 may store text corresponding to various prompts that may be output to users of the system 100. Prompt text, in the prompt storage 285, may be associated with a skill identifier. Prompt text, in the prompt storage 285, may be associated with respective prompt identifiers.

In at least some examples, the prompt text may be provided to the natural language processing system 120 by a skill developer through the skill developer's device. Moreover, in at least some examples, prompt text, in the prompt storage 285, may be associated with an information identifier and a skill identifier. In such examples, the information selection component 275 may query the prompt storage 285 for prompt text associated with the information identifier and the skill identifier (corresponding to the skill 290 that sent the output information request 505) to the information selection component 275.

In response to the query, the information selection component 275 may receive (604) text corresponding a prompt associated with the information identifier (and optionally the skill identifier). As detailed above, prompt text may be provided by a skill developer. In other examples, prompt text may be generated by the natural language processing system 120. For example, a skill developer may simply provide the natural language processing system 120 with information to be output, and the natural language processing system 120 may generate prompt text for the information, with the resulting prompt text being associated with the information identifier (and optionally the skill identifier) in the prompt storage 285. In at least some examples, skill developer provided prompt text and natural language system generated prompt text may be stored in different storages.

In at least some examples, the prompt text may include context in addition to the information to be output. Such context may include phrases such as "this is something helpful for your skill," "we have a personalized offer just for you," etc.

The information selection component 275 may determine (606) a manner in which the prompt text is to be output to the user. For example, the information selection component 275 may determine the prompt text is to be output as audio (output from TTS processing of the prompt text) by a device 110. For further example, the information selection component 275 may determine the prompt text should be presented on a display of a device 110. In another example, the information selection component 275 may determine the prompt text is to be output as audio by a device 110 and presented on a display of the same or a different device 110 (the different devices may be associated with the same profile in the profile storage 270). The information selection component 275's determination, as to how the prompt text is to be output, may be based on which manners of outputting information to the user in the past resulted in acceptance by the user. Such determination may additionally or alternatively be based on output capabilities of the device 110 the user is using to conduct the skill session. For example, if the device 110 has speakers but not display, the information selection component 275 may determine the prompt text is to be output as audio using the speakers. For further example, if the device 110 has speakers and a display, the information selection component 275 may determine the prompt text is to be output as audio using the speakers and/or presented on the display.

The information selection component 275 may send (608), to the orchestrator component 230, prompt configuration data. The prompt configuration data 608 may include, for example, a device identifier(s) of the device(s) 110 to output the prompt, the user identifier of the user, the skill identifier (corresponding to the skill 290 that sent the output information request 505 to the information selection component 275), the skill session identifier, a present point of the skill session, the information identifier (corresponding to the information to the output), the prompt text, and data representing how the prompt text is to be output (e.g., as audio and/or text). In at least some examples, when the prompt configuration data indicates the prompt text is to be output as audio, the prompt configuration data may include speech synthesis markup language (SSML), which indicates to the TTS component 280 how synthesized speech is to be generated from the prompt text.

The orchestrator component 230 may generate (610) prompt data based on the prompt configuration data. For example, if the prompt configuration data indicates the prompt text is to be output as audio, the orchestrator component 230 may send the prompt text (and SSML if such is included in the prompt configuration data) to the TTS component 280, and may in turn receive audio data corresponding to synthesized speech representing the prompt text. For further example, if the prompt configuration data indicates the prompt text is to be presented on a display, the prompt data may include the prompt text. In another example, if the prompt configuration data indicates the prompt text is to be output as audio and presented on a display, the prompt data may include audio data (output by the TTS component 280) and the prompt text. The prompt data may, in addition to including the audio data and/or prompt text, include, for example, the user identifier of the user, the skill identifier (corresponding to the skill 290 that sent the output information request 505 to the information selection component 275), and/or the skill session identifier. In at least some examples, the prompt data may include an image or video to be presented on a display of a device 110 as part of output information to the user. The orchestrator component 230 may send (610) the prompt data to one or more devices 110 corresponding to the device identifier(s) represented in the prompt configuration data. For example, the prompt configuration data may indicate a first device is to output audio and a second device is to present text on its display. In such an example, the orchestrator component 230 may send a portion of the prompt data (corresponding to prompt audio data) to the first device and a portion of the prompt data (corresponding to prompt text data) to the second device.

The device 110 may output (614) audio (corresponding to received prompt audio data) and/or present content (e.g., prompt text data, an image, and/or video) on a display. While outputting the audio and/or presenting the content, or after outputting the audio and/or presenting the content, the device 110 may receive (616) a natural language input. The natural language input may correspond to natural language speech of the user or a typed natural language input. The device 110 may send (618) natural language input data (e.g., audio data or text data depending on whether the natural language input was spoken or typed, respectively) to the orchestrator component 230.

The orchestrator component 230 may receive (620) NLU results data representing the natural language input. If the natural language input data is audio data, the orchestrator component 230 may send the audio data to the ASR component 250, and in turn receive text data representing the natural language input. The orchestrator component 230 may thereafter sent the text data to the NLU component 260, and in turn receive NLU results data representing the natural language input. Alternatively, if the natural language input data is audio data, the orchestrator component 230 may send the audio data to an SLU component, and in turn receive NLU results data representing the natural language input. If the natural language input data is text data, the orchestrator component 230 may send the text data to the NLU component 260, and in turn receive NLU results data representing the natural language input.

The orchestrator component 230 may determine (622) whether the NLU results data indicates the natural language input accepts or rejects the information. For example, the orchestrator component 230 may determine a <Cancel> NLU intent, or other like NLU intent, may indicate the natural language input rejects the information. For further example, the orchestrator component 230 may determine a <MoreInformation> NLU intent, <Purchase> NLU intent, or other like NLU intent indicates the natural language input accepts the information.

If the orchestrator component 230 determines the NLU results data indicates the natural language input rejects the information (e.g., represents further information is not to be output, represents the user does not want to purchase a product corresponding to the output information, etc.), the orchestrator component 230 may cease (624) processing or pass the user experience back to the skill. For example, the orchestrator component 230 may determine whether the present point in the skill session (represented in the prompt configuration data received by the orchestrator component 230 at step 608) represents the end of the skill session. If the orchestrator component 230 determines the present point in the skill session corresponds to the end of the skill session, the orchestrator component 230 may simply cease processing (or output data indicating the skill session is to be ended). Conversely, if the orchestrator component 230 determines the present point in the skill session did not correspond to the end of the skill session (e.g., corresponded to an nth natural language input of the skill session, represented the skill session had transpired for n amount of time, etc.), the orchestrator component 230 may send, to the skill 290 corresponding to the skill identifier represented in the prompt configuration data received by the orchestrator component 230 at step 608, data representing the skill 290 is to recommence processing with respect to the skill session. This data may effectively pass the user experience back to the skill 290.

If the orchestrator component 230 determines the NLU results data indicates more information is to be output, the orchestrator component 230 may communicate with the information selection component 275, the skill 290, and/or another component of the natural language processing system 120 to output more information regarding the information that was output at step 614.

If the orchestrator component 230 determines the NLU results data indicates the user does wants to purchase a product corresponding to the information output at step 614, the orchestrator component 230 may send (626), to a purchase skill 290*a*, a purchase directive. The purchase directive may include, for example, a device identifier of the device 110 that received the natural language input at step 616 the user identifier, the skill session identifier, the skill identifier (corresponding to the skill 290 that sent the output information request 505 to the information selection component 275), a product identifier (corresponding to the information that was output to the user), and/or a purchase price.

The purchase skill 290a may perform (628) a purchase flow. The purchase flow may include the purchase skill 290 sending data to and received data from the device 110 for purposes of performing a purchase with respect to the product identifier and purchase price. For example, the purchase flow may include the purchase skill 290a, in conjunction with the user recognition component 295, authenticating the user to ensure the user has permission to perform the purchase. The purchase flow may also include the purchase skill 290a sending, to a banking system (corresponding to a banking institution represented in a profile associated with the user identifier in the profile storage 270) various details of the purchase, and in turn receiving a confirmation that the purchase has been approved by the banking system.

Once the purchase flow is complete, the purchase skill 290a may cause a record of the purchase to be stored. This stored record may be thereafter used by the model(s), implemented by the information selection component 275, to ensure information, corresponding to the purchased product, is not output to the user again (or to ensure the information is not output to the user too frequently).

Once the purchase flow is complete, the purchase skill 290a may send (630), to the orchestrator component 230, purchase result data. The purchase result data may include, for example, the skill session identifier, the skill identifier (corresponding to the skill 290 that sent the output information request 505 to the information selection component 275), and a result of the purchase flow (e.g., success or failed). If the purchase result data 630 represents the purchase was successful, the orchestrator component 230 may send, to the skill 290 corresponding to the skill identifier, data representing the skill 290 is to recommence processing with respect to the skill session. This may enable the user to begin using the purchased product.

Alternatively, after the orchestrator component 230 receives the purchase result data, the orchestrator component 230 may cease (632) processing or pass the user experience back to the skill 290 based on whether the present point in the skill session represents the end of the skill session. If the orchestrator component 230 determines the present point in the skill session corresponds to the end of the skill session, the orchestrator component 230 may simply cease processing (or output data indicating the skill session is to be ended). Conversely, if the orchestrator component 230 determines the present point in the skill session did not correspond to the end of the skill session (e.g., corresponded to an nth natural language input of the skill session, represented the skill session had transpired for n amount of time, etc.), the orchestrator component 230 may send, to the skill 290, data representing the skill 290 is to recommence processing with respect to the skill session. This data may effectively pass the user experience back to the skill 290.

The natural language processing system 120 may use user acceptance and rejection of output information to train the model(s) implemented by the information selection component 275. In at least some examples, user acceptances and rejections may be used to alter weights associated with inputs to the model(s).

In at least some examples, a user may perform a dialog with the natural language processing system 120. As used herein, a "dialog" may refer to two or more consecutive skill sessions that relate to a single originating natural language input. For example, an initial natural language input of the dialog may be "buy me a ticket to the movie tonight at 7 pm." This natural language input may correspond to a first skill session corresponding to a first skill that communicates with an electronic movie ticket system to buy the requested movie ticket. Once the movie ticket has been ordered, the natural language processing system 120 may receive a second natural language input corresponding to the same dialog. For example, the second natural language input may correspond to "book me dinner reservation to my favorite restaurant at 5 pm." This second natural language input may correspond to a second skill session corresponding to a second skill that communicates with a restaurant's online reservation portal to book the requested reservation. Moreover, after the restaurant reservation has been booked, the natural language processing system 120 may receive a third natural language input corresponding to the same dialog. For example, the third natural language input may correspond to "book me a ride to my favorite restaurant." This third natural language input may correspond to a third skill session corresponding to a third skill that communicates with a taxi booking portal to book the requested ride.

In the foregoing illustrative dialog, each skill session may be associated with a different skill session identifier but the same dialog identifier. As such, a dialog identifier may be associated with multiple skill session identifiers. A dialog identifier may be used by components of the overall system 100 to track information across the dialog.

In some examples, a dialog-initiating natural language input may start with a wakeword and end with a command. Subsequent natural language inputs of the same dialog may not start with speaking of a wakeword.

In at least some examples, a first skill, corresponding to a skill session, may indicate that information should be output for a second skill corresponding to a subsequent skill session of the same dialog. For example, the first skill may be a restaurant reservation skill and the second skill may be a taxi skill. The first skill may indicate that the user may save money on their restaurant reservation the user just booked if the user invokes the taxi skill to book a ride to the restaurant. For further example, a second skill may indicate that information for the second skill should be output at the end of a skill session of a first skill. For example, a taxi skill may indicate information, representing a price discount for a taxi ride or otherwise soliciting a user to purchase a taxi ride, should be output at the end of a skill session corresponding to a user interacting with restaurant reservation skill to book a reservation.

Figure 7:
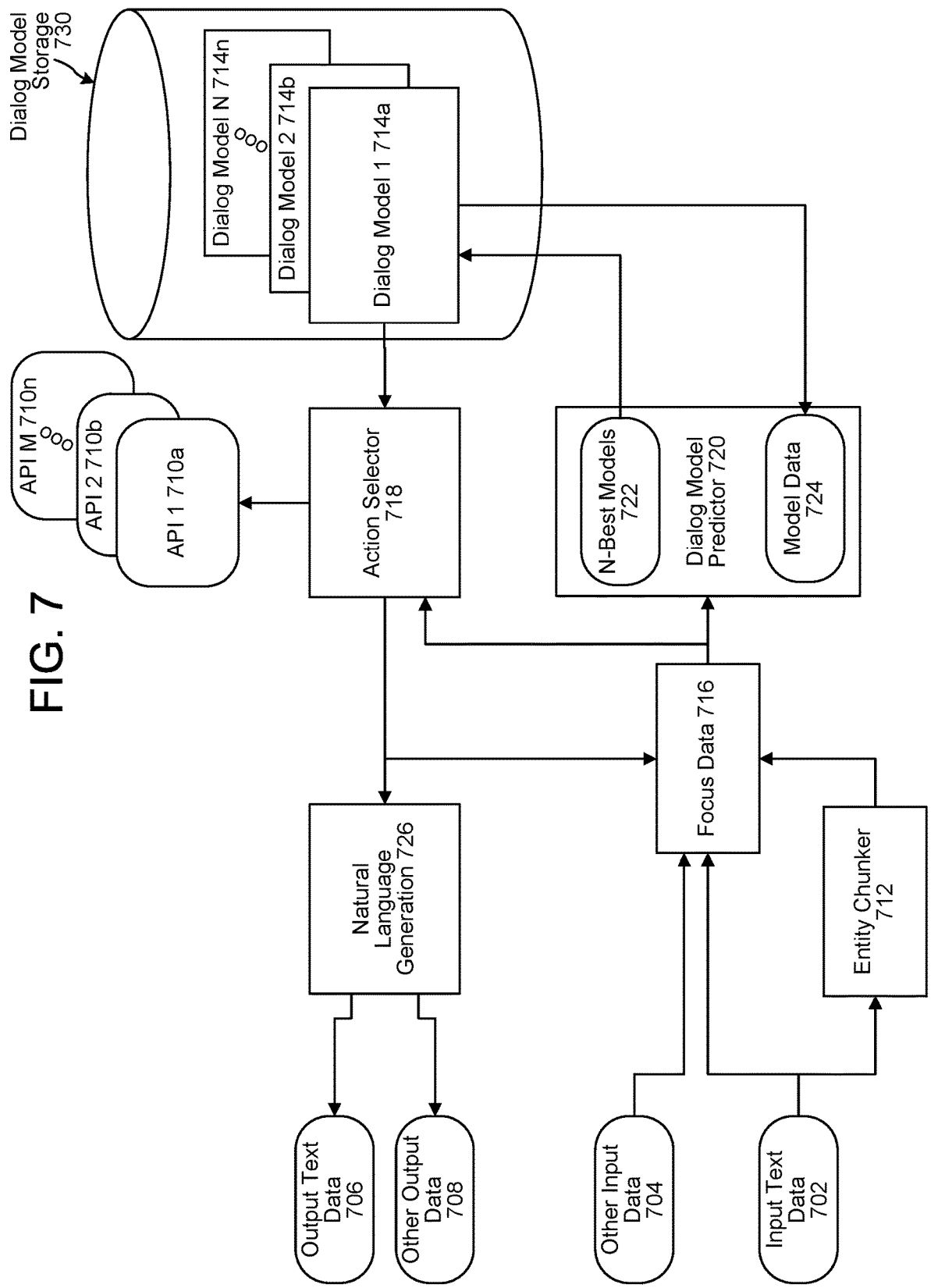
FIG. 7 illustrates a system for managing a goal-oriented dialog using multiple dialog models, in accordance with embodiments of the present disclosure.

FIG. 7 is an illustrative diagram of a dialog system according to embodiments of the present disclosure. Components of the dialog system may reside as part of system 120 or may be otherwise configured. The system receives input text data 702; the input text data 702 may include text corresponding to a user input and metadata indicating further information about the text (such as an identity of the user, an emotional state of the user, etc.). The input text data 702 may be text representing words, instructions, markup language, speech, or gestures, or may be a vector or other representation of the same. The input text data 702 may be generated by a user via a keyboard, touchscreen, microphone, camera, or other such input device. In other examples, the input text data 702 is created using ASR, as described above, from audio data received from a user device. The system may further receive other input data 704, which may correspond to a button press, gesture, or other input. As described in greater detail below, using the input text data 702 and/or other input data 704, the system may determine and output output text data 706 and/or other output data 708. The system may additionally or alternatively perform an action based on the input text data 702 and/or other input data 704, such as calling one or more APIs 710.

An entity chunker 712 may be used to determine that the input text data 702 includes a representation of one or more entities, a process that may include named entity recognition (NER) processing, which determines that the input text data 702 includes the representation, and entity resolution (ER) processing, which identifies a meaning or context of the entity, such as associating an identity of a person based on a recognized nickname. An entity may be a person, place, thing, idea, and/or goal. Example entities include proper names, nicknames, business names, place names, and/or application names.

In some examples, a single entity chunker 712 is used for more than one domain (i.e., a "cross-domain" entity chunker 712). Each domain may correspond to one or more dialog models 714 (which are described in greater detail below). In other embodiments, a plurality of entity chunkers 712 each correspond to a subset of the dialog models 714 (i.e., "single-domain" entity chunkers 712). One or more candidate domains corresponding to the input text data 702 may be determined by processing of the input text data 712 by entity chunkers 712 corresponding to the candidate domains. Dialog focus data 716 may store the output entities from each candidate domain and may remove unselected entities when dialog model 714 is selected.

The dialog focus data 716 may store state data corresponding to dialog history data, action history data, and/or other data. In some embodiments, other components (e.g., an action selector 718) do not store state data and instead query the dialog focus data 716 for the state data. The system may send some or all of the dialog focus data 716 to other systems and/or may receive additional dialog focus data from other systems. In some embodiments, the other components (e.g., the action selector 718) include a feature-extractor component to extract features from the dialog focus data 716.

The dialog focus data 716 may be graph-based data including a plurality of graph nodes. Each graph node may correspond to an item of state data, such as an entity type, entity value, prior API call, and/or user data. The other components, such as the action selector 718, may access all of the graph nodes of the dialog focus data 716 or may access only a subset of the graph nodes of the dialog focus data 716. The dialog focus data 716 may be any type of storage mechanism and may serve as long-term and/or short term memory for the system, thus enabling tracking of entities, ASR output, TTS output, and other features through a dialog. In some examples, the dialog focus data 716 is updated after each turn (e.g., user input or system output) of dialog with updated dialog focus data. In other embodiments, the dialog focus data 716 is updated after an end of a dialog is determined.

The entity chunker 712 may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain skills 290 (e.g., a shopping skill, a music skill, a video skill, etc.), or may be organized in a variety of other ways.

For example, the entity chunker 712 may parse the input text data 702 to identify words as subject, object, verb, preposition, etc. based on grammar rules and/or models prior to recognizing named entities in the text data. The entity chunker 712 may perform semantic tagging, which is the labeling of a word or combination of words according to their type/semantic meaning. The entity chunker 712 may parse text data using heuristic grammar rules, or a model may be constructed using techniques such as Hidden Markov Models, maximum entropy models, log linear models, conditional random fields (CRF), and the like. For example, an entity chunker 712 implemented by a music skill recognizer may parse and tag text data corresponding to "play mother's little helper by the rolling stones" as {Verb}: "Play," {Object}: "mother's little helper," {Object Preposition}: "by," and {Object Modifier}: "the rolling stones." The entity chunker 712 identifies "Play" as a verb based on a word database associated with the music skill and may determine that the verb corresponds to a <PlayMusic> intent.

The entity chunker 712 may tag text data to attribute meaning thereto. For example, the entity chunker 712 may tag "play mother's little helper by the rolling stones" as: {skill} Music, {intent}<PlayMusic>, {artist name} rolling stones, {media type} SONG, and {song title} mother's little helper. For further example, the entity chunker 312 may tag "play songs by the rolling stones" as: {skill} Music, {intent}<PlayMusic>, {artist name} rolling stones, and {media type} SONG.

The entity chunker 712 may apply rules or other instructions to transform labels or tokens into a standard representation. The transformation may depend on the skill 290. For example, for a travel skill, the entity chunker 712 may transform text data corresponding to "Boston airport" to the standard BOS three-letter code referring to the airport. The entity chunker 712 can refer to an entity storage(s) (including text data representing entities known to the system) to resolve the precise entity referred to in each slot of each NLU hypothesis represented in the cross-skill N-best list data. Specific intent/slot combinations may also be tied to a particular source, which may then be used to resolve the text data. In the example "play songs by the stones," the entity chunker 712 may reference a personal music catalog, Amazon Music account, user profile data, or the like. The entity chunker 712 may output text data including an altered N-best list that is based on the cross-skill N-best list data, and that includes more detailed information (e.g., entity IDs) about the specific entities mentioned in the slots and/or more detailed slot data that can eventually be used by a skill 290. The entity chunker 712 may include multiple entity resolution components and each entity resolution component may be associated with one or more particular skills 290.

The entity chunker 712 may use frameworks linked to the intent to determine what database fields should be searched to determine the meaning of tagged entities, such as searching a user's gazetteer for similarity with the framework slots. For example, a framework for a <PlayMusic> intent might indicate to attempt to resolve an identified object based on {Artist Name}, {Album Name}, and {Song name}, and another framework for the same intent might indicate to attempt to resolve an object modifier based on {Artist Name}, and resolve the object based on {Album Name} and {Song Name} linked to an identified {Artist Name}. If the search of the gazetteer does not resolve a slot/field using gazetteer information, the entity chunker 712 may search a database of generic words associated with the skill 290. For example, if the text data includes "play songs by the rolling stones," after failing to determine an album name or song name called "songs" by "the rolling stones," the entity chunker 712 may search the skill vocabulary for the word "songs." In the alternative, generic words may be checked before the gazetteer information, or both may be tried, potentially producing two different results.

The entity chunker 712 may include a ranker component. The ranker component may assign a particular confidence score to each hypothesis input therein. The confidence score of a hypothesis may represent a confidence of the system in the processing performed with respect to the hypothesis. The confidence score of a particular hypothesis may be affected by whether the hypothesis has unfilled slots. For example, if a hypothesis associated with a first skill component includes slots that are all filled/resolved, that NLU hypothesis may be assigned a higher confidence score than another hypothesis including at least some slots that are unfilled/unresolved by the entity chunker 712.

Dialog focus data 716 may store data relevant to a dialog. In various embodiments, the dialog focus data 716 stores the input text data 702, other input data 704, entity data from the entity chunker 712 and/or action data and dialog data from an action selector 718 (described in greater detail below). The dialog focus data 716 may further include additional information, such as location data, user preference data, and environment data. In various embodiments, the dialog focus data 716 uses an encoder to encode some or all of the received data into one or more feature vectors and a decoder to determine, based on the feature vectors, intent data corresponding to an intent of a user. The dialog focus data 716 may further include state data that represents one or more prior dialogs of the user, actions, or other prior user information or data.

The dialog focus data 716 may be used by a dialog model predictor 720 to select one or more dialog models 714 in dialog model storage 730 for further processing of the input text data 702. Each dialog model may be associated with one or more categories of functions. The dialog model predictor 720 may be a trained model, such as a classifier. In various embodiments, the dialog model predictor 720 generates an N-best list 722 of the dialog models 714 for further processing. The dialog model predictor 720 may create the N-best list by determining a score for each dialog model 714 given the dialog focus data 716 and model data 724. The model data 724 may include a type of each dialog model 714 and APIs and corresponding entities for each dialog model 714. The dialog model predictor may, for example, determine the score based on presence or absence of one or more entities determined by the entity chunker 712 in the model data 724; presence of an entity in a list of entities corresponding to a dialog model 714 may, for example, indicate a higher score. The dialog model predictor 720 may thus send the input text data 702 to the models 714 having the N highest scores; in other embodiments, the dialog model predictor 720 sends the input text data 702 to the models 714 having scores greater than a threshold. The threshold may be a numerical value or the number N of models 714 to be selected.

The selected dialog model(s) 714 may process the input text data 702; in some embodiments, the dialog model(s) 714 also receive the other input data 704 and/or dialog focus data 716. Each dialog model 714 may be a trained model, such as a sequence-to-sequence model, and may be trained using goal-oriented dialog training data. The training data may include a dialog between a user and a system and may include API call information related to goals expressed by the user.

Each of the selected dialog models 714 generates response data based on the input text data 702. The response data may include output text data, which may correspond to a prompt for more information (e.g., additional entity information). The response data may further include API call data and corresponding entities.

The action selector 718 selects at least one of the outputs of the dialog model(s) 714 for further processing. Each output may be associated with a corresponding category of function(s). The action selector 718 may be a trained model, such as a classifier, and may determine a score for each of the outputs of the dialog models 714 based on each's similarity or relevance to the dialog focus data 716, based on user preference data, and/or based on the input text data 702. The output of the dialog model 714 corresponding to the highest score is selected; if the output is an API call, one or more APIs 710 may be activated and a corresponding action carried out. If, however, the output is a prompt or other output data, a natural language generator 726 may be used to generate the output text data 706 and/or other output data 708 based on the output of the dialog model 714. In either case, the action may be used to update the dialog focus data 716.

In at least some examples, the information selection component 275 may consider the focus data 716 when determining whether information is to be output to a user.

Figure 8A:
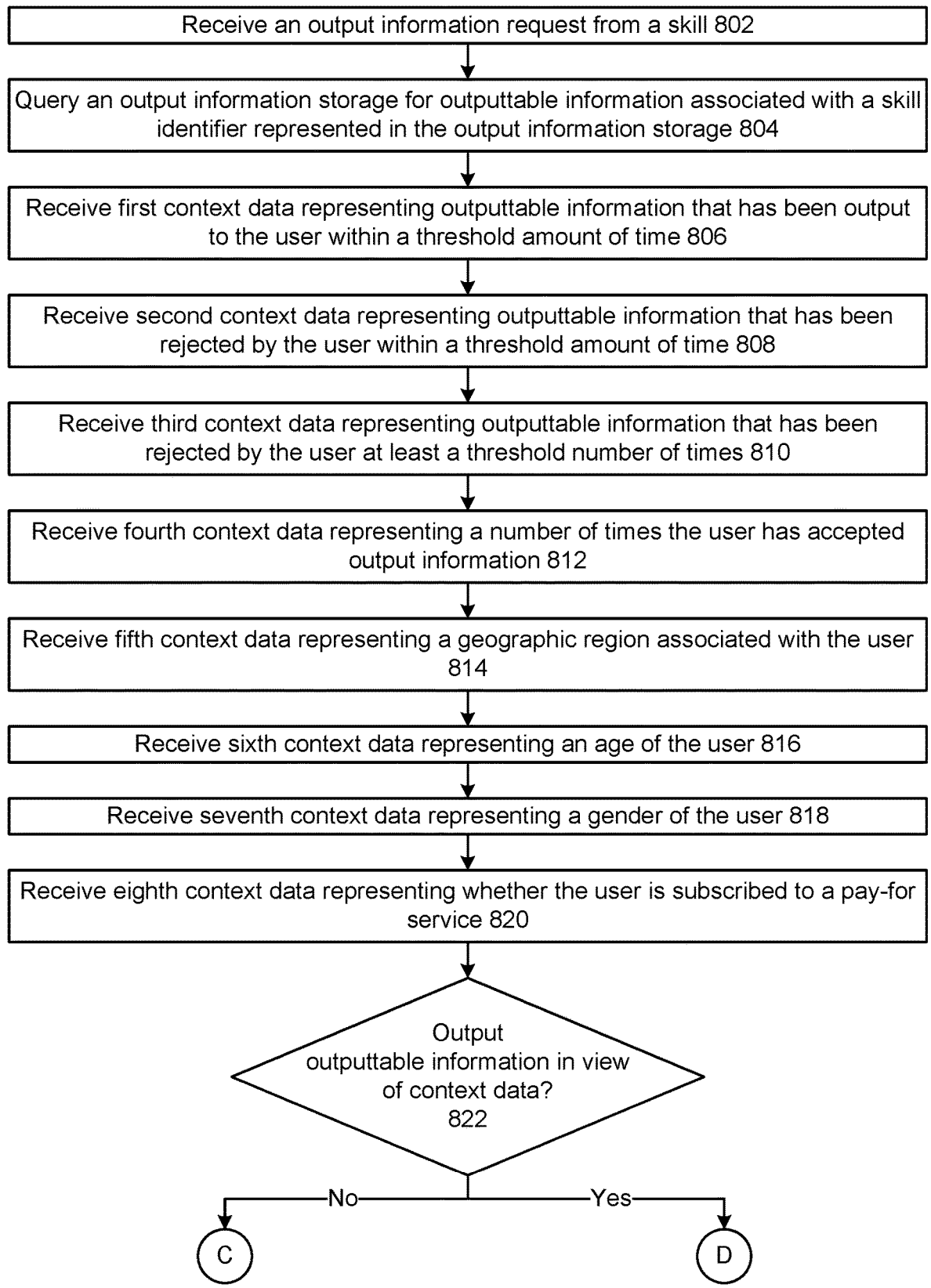
FIGS. 8A and 8B are a process flow diagram illustrating how an information selection component of a natural language processing system may execute, in accordance with embodiments of the present disclosure.
Figure 8B:
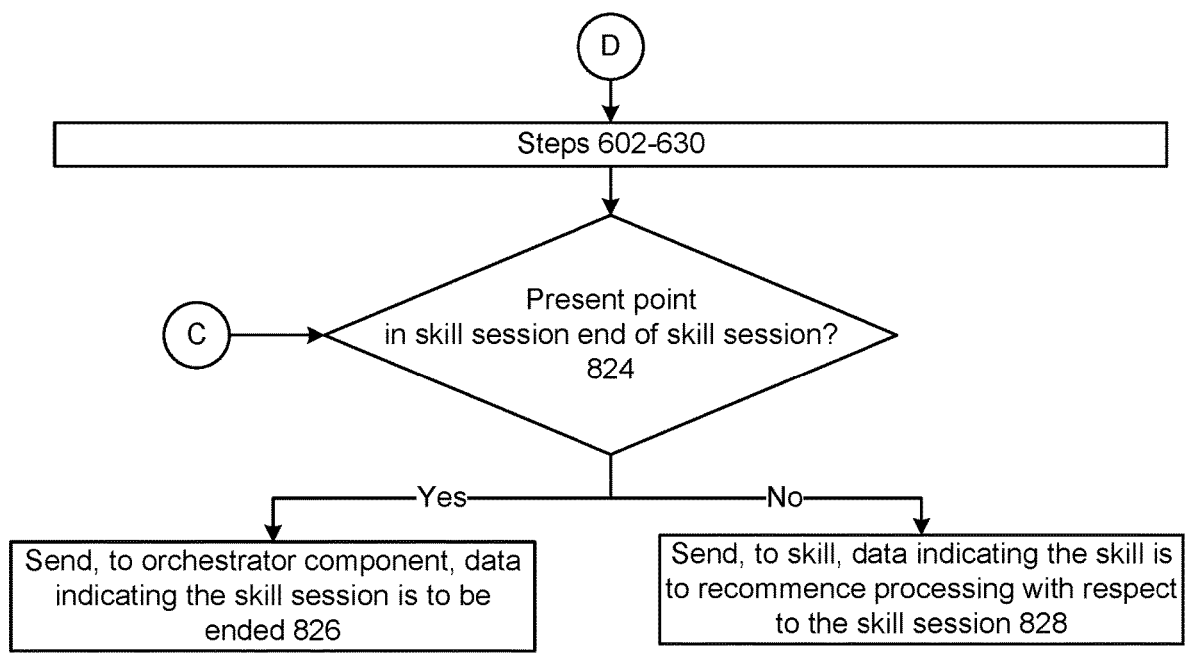

FIGS. 8A and 8B illustrate an example of how the information selection component 275 may execute at runtime. The information selection component 275 may receive (802) an output information request 505 from a skill. The output information request 505 may include, for example, the skill's identifier, a domain to which the skill identifier is associated, the skill session identifier, a user identifier (representing the user providing the natural language input(s) of the skill session), and/or a device identifier (representing the device 110 that captured the natural language input(s) of the skill session).

After receiving the output information request 505, the information selection component 275 may query (804) the output information storage 255 for information associated with the skill identifier represented in the output information request 505. Each piece of information, in the output information storage 255, may be associated with a respective information identifier. When the output information storage 255 stores information identifiers, querying of the output information storage 255 may result in the information selection component 275 receiving one or more information identifiers 515 associated with the skill identifier in the output information storage 255.

The information selection component 275 may receive (806) first context data representing outputtable information that has been output to the user within the threshold amount of time. The information selection component 275 may additionally or alternatively receive (808) second context data representing outputtable information that has been rejected by the user within the threshold amount of time. The information selection component 275 may additionally or alternatively receive (810) third context data representing outputtable information that has been rejected by the user at least a threshold number of times. The natural language processing system 120 may receive (812) fourth context data representing a number of times the user as acceptable output information. The information selection component 275 may additionally or alternatively receive (814) fifth context data representing a geographic region associated with the user. The information selection component 275 may additionally or alternatively receive (816) sixth context data representing an age of the user. The information selection component 275 may additionally or alternatively receive (818) seventh context data representing a gender of the user. The information selection component 275 may additionally or alternatively receive (820) eighth context data representing whether the user is subscribed to a pay-for service.

The information selection component 275 may implement one or more trained machine learning models to determine (822) whether, based on the received context data, information is to be output to the user. If the information selection component 275 determines information is not to be output, the information selection component 275 may determine (824) whether the present point in the skill session is the end of the skill session. If the information selection component 275 determines the present point in the skill session corresponds to the end of the skill session, the information selection component 275 may send (826), to the orchestrator component 230, data indicating the skill session is to be ended. Conversely, if the information selection component 275 determines the present point in the skill session did not correspond to the end of the skill session, the information selection component 275 may send (828), to the skill 290, data representing the skill 290 is to recommence processing with respect to the skill session.

If, at step 822, the information selection component 275 determines the output information is to be output in view of the context data, the information selection component 275 may cause steps 602-630 to be performed. At the end of processing of step 630, the information selection component 275 may then perform step 824 and 826 or 828.

FIG. 9 is a block diagram conceptually illustrating a device 110 that may be used with the system. FIG. 10 is a block diagram conceptually illustrating example components of a remote device, such as the natural language processing system 120, which may assist with ASR processing, NLU processing, etc., and a skill system 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system 100 of the present disclosure, such as one or more natural language processing systems 120 for performing ASR processing, one or more natural language processing systems 120 for performing NLU processing, one or more skill systems 225, etc. In operation, each of these systems may include computer-readable and computer-executable instructions that reside on the respective device (120/225), as will be discussed further below.

Each of these devices (110/120/225) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/225) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (902/1002).

Computer instructions for operating each device (110/120/225) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/225) includes input/output device interfaces (902/1002). A variety of components may be connected through the input/output device interfaces (902/1002), as will be discussed further below. Additionally, each device (110/120/225) may include an address/data bus (924/1024) for conveying data among components of the respective device. Each component within a device (110/120/225) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110, the natural language processing system 120, or a skill system 225 may include their own dedicated processors, memory, and/or storage. Alternatively, one or more of the components of the device(s) 110, the natural language processing system 120, or a skill system 225 may utilize the I/O interfaces (902/1002), processor(s) (904/1004), memory (906/1006), and/or storage (908/1008) of the device(s) 110, natural language processing system 120, or the skill system 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language processing system 120, and a skill system 225, as described herein, are illustrative, and may be located as a stand-alone device or may be included, in whole or in part, as a component of a larger device or system.

As illustrated in FIG. 11, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the natural language processing system 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
receiving first text data corresponding to a first application, the first text data representing first information to be output at a first point during a future dialog;
receiving, from a first device and after receiving the first text data, first input audio data representing a first utterance;
performing speech processing on the first input audio data to determine first natural language understanding (NLU) results data representing the first utterance;
determining the first application is to execute with respect to the first utterance;
sending the first NLU results data to the first application;
receiving, from the first application, a first indication that an ongoing first dialog has reached the first point;
determining a previous instance when the first information was output using the first device;

determining a threshold amount of time has elapsed since the previous instance occurred;

causing the first device to output the first information based at least in part on determining the threshold amount of time has elapsed;

receiving, from the first device and after causing the first device to output the first information, second input audio data representing a second utterance;

determining the second utterance represents an approval to perform an action corresponding to the first information;

causing the action to be performed; and sending, to the first application and after causing the action to be performed, a second indication for the first application to resume processing with respect to the ongoing first dialog.

2. The method of claim 1, further comprising:

receiving second text data corresponding to a second application, the second text data representing second information to be output after the first application performs a first action responsive to a natural language input, the second information corresponding to a second action performable by the second application;

receiving, from the first device, third input audio data representing a third utterance;

performing speech processing on the third input audio data to determine second NLU results data representing the third utterance;

determining the first application is to execute with respect to the third utterance;

sending the second NLU results data to the first application;

receiving, from the first application, a third indication that the first action has been performed;

causing the first device to output the second information after receiving the third indication and based at least in part on the second text data;

receiving, from the first device and after causing the first device to output the second information, fourth input audio data representing a fourth utterance;

determining the fourth utterance represents the second action is to be performed; and sending, to the second application, a representation of the fourth utterance, wherein receipt of the representation by the second application causes the second application to perform the second action.

3. A system comprising:

at least one processor; and at least one memory comprising instructions that, when executed by the at least one processor, cause the system to:

receive first data including first information to be output at a first point during a future dialog corresponding to a first application;

receive, from a first device and after receiving the first data, second data representing a first natural language input;

determine the first application is to execute with respect to the first natural language input;

send, to the first application, third data representing the first natural language input;

receive, from the first application, a first indication that an ongoing first dialog has reached the first point; and cause, based at least in part on receiving the first indication, the first device to output the first information that was received prior to receiving the first natural language input.

4. The system of claim 3, wherein the at least one memory further comprises instructions that, when executed by the at least one processor, further cause the system to:

determine a previous instance when the first information was output using the first device;

determine a threshold amount of time has elapsed since the previous instance occurred; and cause the first device to output the first information further based at least in part on determining the threshold amount of time has elapsed.

5. The system of claim 3, wherein the at least one memory further comprises instructions that, when executed by the at least one processor, further cause the system to:

receive, from the first device and after causing the first device to output the first information, fourth data representing a second natural language input;

determine the second natural language input represents further information is to be output, the further information relating to the first information;

cause the further information to be output; and send, to the first application and after causing the further information to be output, a second indication for the first application to resume processing with respect to the ongoing first dialog.

6. The system of claim 3, wherein the at least one memory further comprises instructions that, when executed by the at least one processor, further cause the system to:

receive, from the first device and after causing the first device to output the first information, fourth data representing a second natural language input;

determine the second natural language input represents further information is to be output, the further information relating to the first information;

cause the further information to be output;

determine, after causing the further information to be output, that the first point corresponds to a third natural language input representing the ongoing first dialog is to be closed; and cease, after determining the first point corresponds to the third natural language input, processing with respect to the ongoing first dialog.

7. The system of claim 3, wherein the at least one memory further comprises instructions that, when executed by the at least one processor, further cause the system to:

receive, from the first device and after causing the first device to output the first information, fourth data representing a second natural language input;

determine the second natural language input represents further information is to be output, the further information relating to the first information;

cause the further information to be output;

determine, after causing the further information to be output, that the first point corresponds to a predetermined nth natural language input of the ongoing first dialog; and send, to the first application and after determining the first point corresponds to the predetermined nth natural language input, a second indication for the first application to resume processing with respect to the ongoing first dialog.

8. The system of claim 3, wherein the at least one memory further comprises instructions that, when executed by the at least one processor, further cause the system to:

receive, from the first device and after causing the first device to output the first information, fourth data representing a second natural language input;
determine the second natural language input represents further information is to be output, the further information relating to the first information;
cause the further information to be output;
determine, after causing the further information to be output, that the first point corresponds to a timestamp of the ongoing first dialog, the timestamp representing the ongoing first dialog has transpired for at least a threshold amount of time; and
send, to the first application and after determining the first point corresponds to the timestamp, a second indication for the first application to resume processing with respect to the ongoing first dialog.

9. The system of claim 3, wherein the at least one memory further comprises instructions that, when executed by the at least one processor, further cause the system to:
receive, from the first device and after causing the first device to output the first information, fourth data representing a second natural language input;
determine the second natural language input represents further information is to be output, the further information relating to the first information;
cause the further information to be output; and
send, to the first application and after causing the further information to be output, a second indication for the first application to begin processing with respect to a second dialog and the further information.

10. The system of claim 3, wherein the first natural language input corresponds to an utterance, and wherein the at least one memory further comprises instructions that, when executed by the at least one processor, further cause the system to:
cause the first device to output the first information using a display of the first device.

11. The system of claim 3, wherein the at least one memory further comprises instructions that, when executed by the at least one processor, further cause the system to:
determine a profile associated with the first device;
determine a second device represented in the profile; and
cause the second device to output the first information via a display associated with the second device.

12. The system of claim 3, wherein the at least one memory further comprises instructions that, when executed by the at least one processor, further cause the system to:
receive fourth data representing second information to be output after the first application performs a first action responsive to a natural language input, the second information corresponding to a second action performable by a second application;
receive, from the first device, fifth data representing a second natural language input;
determine the first application is to execute with respect to the second natural language input;
send, to the first application, sixth data representing the second natural language input;
receive, from the first application, a second indication that the first action has been performed;
cause the first device to output the second information after receiving the second indication and based at least in part on the fourth data;
receive, from the first device and after causing the first device to output the second information, sixth data representing a third natural language input;
determine the third natural language input represents the second action is to be performed; and
send, to the second application, seventh data representing the third natural language input, wherein receipt of the seventh data by the second application causes the second application to perform the second action.

13. A method comprising:
receiving first data including first information to be output at a first point during a future dialog corresponding to a first application;
receiving, from a first device and after receiving the first data, second data representing a first natural language input;
determining the first application is to execute with respect to the first natural language input;
sending, to the first application, third data representing the first natural language input;
receiving, from the first application, a first indication that an ongoing first dialog has reached the first point; and
causing, based at least in part on receiving the first indication, the first device to output the first information that was received prior to receiving the first natural language input.

14. The method of claim 13, further comprising:
determining a previous instance when the first information was output using the first device;
determining a threshold amount of time has elapsed since the previous instance occurred; and
causing the first device to output the first information further based at least in part on determining the threshold amount of time has elapsed.

15. The method of claim 13, further comprising:
receiving, from the first device and after causing the first device to output the first information, fourth data representing a second natural language input;
determining the second natural language input represents further information is to be output, the further information relating to the first information;
causing the further information to be output; and
sending, to the first application and after causing the further information to be output, a second indication for the first application to resume processing with respect to the ongoing first dialog.

16. The method of claim 13, further comprising:
receiving, from the first device and after causing the first device to output the first information, fourth data representing a second natural language input;
determining the second natural language input represents further information is to be output, the further information relating to the first information;
causing the further information to be output;
determining, after causing the further information to be output, that the first point corresponds to a third natural language input representing the ongoing first dialog is to be closed; and
ceasing, after determining the first point corresponds to the third natural language input, processing with respect to the ongoing first dialog.

17. The method of claim 13, further comprising:
receiving, from the first device and after causing the first device to output the first information, fourth data representing a second natural language input;
determining the second natural language input represents further information is to be output, the further information relating to the first information;
causing the further information to be output;

determining, after causing the further information to be output, that the first point corresponds to a predetermined nth natural language input of the ongoing first dialog; and sending, to the first application and after determining the first point corresponds to the predetermined nth natural language input, a second indication for the first application to resume processing with respect to the ongoing first dialog.

18. The method of claim 13, further comprising:

receiving, from the first device and after causing the first device to output the first information, fourth data representing a second natural language input;

determining the second natural language input represents further information is to be output, the further information relating to the first information;

causing the further information to be output;

determining, after causing the further information to be output, that the first point corresponds to a timestamp of the ongoing first dialog, the timestamp representing the ongoing first dialog has transpired for at least a threshold amount of time; and sending, to the first application and after determining the first point corresponds to the timestamp, a second indication for the first application to resume processing with respect to the ongoing first dialog.

19. The method of claim 13, further comprising:

receiving, from the first device and after causing the first device to output the first information, fourth data representing a second natural language input;

determining the second natural language input represents further information is to be output, the further information relating to the first information;

causing the further information to be output; and sending, to the first application and after causing the further information to be output, a second indication for the first application to begin processing with respect to a second dialog and the further information.

20. The method of claim 13, further comprising:

receiving fourth data representing second information to be output after the first application performs a first action responsive to a natural language input, the second information corresponding to a second action performable by a second application;

receiving, from the first device, fifth data representing a second natural language input;

determining the first application is to execute with respect to the second natural language input;

sending, to the first application, sixth data representing the second natural language input;

receiving, from the first application, a second indication that the first action has been performed;

causing the first device to output the second information after receiving the second indication and based at least in part on the fourth data;

receiving, from the first device and after causing the first device to output the second information, sixth data representing a third natural language input;

determining the third natural language input represents the second action is to be performed; and sending, to the second application, seventh data representing the third natural language input, wherein receipt of the seventh data by the second application causes the second application to perform the second action.

\* \* \* \* \*